(12) United States Patent
Ogata et al.

(10) Patent No.: US 6,463,424 B1
(45) Date of Patent: *Oct. 8, 2002

(54) ASSOCIATION UNIT, ASSOCIATION APPARATUS AND METHOD FOR THE SAME

(76) Inventors: Norio Ogata, Obasecho 13-17-501, Tennojiku, Osaka (JP); Koji Ataka, 2-11-4 Kimigaoka, Hasimoto, Wakayama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,722

(22) Filed: Apr. 23, 1998

(30) Foreign Application Priority Data

Apr. 25, 1997 (JP) .............................................. 9-109316

(51) Int. Cl.[7] ................................................. G06N 3/06
(52) U.S. Cl. .............................. 706/18; 706/12; 706/30
(58) Field of Search ................................ 706/18, 12, 30

(56) References Cited

U.S. PATENT DOCUMENTS

| | | | | | |
|---|---|---|---|---|---|
| 4,518,866 A | * | 5/1985 | Clymer | ......................... | 706/34 |
| 4,906,865 A | * | 3/1990 | Holler | ......................... | 706/38 |
| 5,014,219 A | * | 5/1991 | White | ......................... | 706/25 |
| 5,671,336 A | * | 9/1997 | Yoshida et al. | ................ | 706/30 |
| 5,704,016 A | * | 12/1997 | Shigematsu et al. | .......... | 706/41 |
| 5,937,432 A | | 8/1999 | Yamaguchi et al. | | |

OTHER PUBLICATIONS

J. A. Dente et al., "A Fully Connected Network of Bernoulli Units with Correlation Learning," Physics Letters, vol. A211, No. 2, pp. 87–93, Feb. 1996.*

* cited by examiner

Primary Examiner—Mark R. Powell
Assistant Examiner—Wilbert L. Starks, Jr.

(57) ABSTRACT

There is provided a basic association unit for creating an information processing apparatus capable of performing information processing like information processing that actually occurs in central nerve systems of animals including human beings. The association unit is an unit for repeating input and output signals having m input terminals and n output terminals. When a first input signal which is a rectangular wave signal in the form of a pulse is simultaneously input to input terminals in a quantity less than m, an output signal having the same contents as the first input signal is output from particular output terminals which are associated with the input terminals in advance. When a third input signal is input to input terminals in a quantity less than m within a predetermined period of time after a second input signal is simultaneously input to input terminals in a quantity equal to or greater than m, an output signal having the same contents as that of the third input signal is output from all output terminals.

12 Claims, 39 Drawing Sheets

INPUT TERMINAL

OUTPUT TERMINAL

INPUT TERMINAL

OUTPUT TERMINAL

— SIGNAL FLOWS
--- NO SIGNAL FLOWS

— SIGNAL FLOWS
--- NO SIGNAL FLOWS

— SIGNAL FLOWS
--- NO SIGNAL FLOWS

FIG.23

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

CONSTRUCTION OF 2-2 UNIT
USIING 2-3 UNIT (k=2)

ASSOCIATION UNIT, ASSOCIATION APPARATUS AND METHOD FOR THE SAME

BACKGROUND OF THE INVENTION

1. Field of the Invention

The present invention relates to an unit having an associative function which is obtained from an analysis on actions of nerves and brains of animals including human beings (hereinafter referred to as "association unit"), a method for information processing such as recording and reproduction of information utilizing such an unit, and a machine including an information processing computer and operating in close resemblance to animals which belongs to the field of information processing apparatuses such as electronic computers and, more particularly, to the field of artificial intelligence.

2. Description of the Related Art

Current electronic computers perform information processing by recording required information in a storage device after converting it into binary notation and by processing and outputting the recorded information in a central processing unit (also referred to as "CPU") in accordance with instructions and procedures stored in a storage device. Recently, electronic computers have become able to perform operations such as calculations of numerical values more accurately and quickly as a result of improvements on central processing units, the heart of electronic computers, which have increased speed of information processing and the amount of information that can be processed at a time. However, they are not good at processing information including ambiguity that a man can do very easily such as recognition of faces, voices, tastes, smells and the like, interpretation of braille points and interpretation of sentences (collectively referred to as "pattern recognition"). The inventor has made a study into the functions of nerves and brains of animals and conceived and developed an "association unit" having a function which is very similar to information processing that animals do.

Information processing that a human being does ("memorizing" that is to record information and "recalling" that is to read the record) is characterized in that pieces of information related to each other are memorized as one group and in that a piece of information memorized in advance is recalled from another piece of information which is related to the same.

For example, a man who has heard and memorized a story that Newton discovered the universal gravitation when he saw an apple dropping from an apple tree recalls the name "Newton" from an "apple" on a table.

Such an action of association allows a piece of input information to be understood to some degree of accuracy even if it is not in perfect coincidence with another piece of information stored in advance. This is a method of information processing which is completely different from methods for information retrieval based on perfect coincidence of information and information processing performed in electronic computers wherein pieces of information are recorded separately without any association therebetween although they are recorded accurately.

Further, a human being experiences a phenomenon referred to as "illusion" (referred to as "optical illusion" when it relates to the sense of sight) which is related to such "association". This in a phenomenon that input information is erroneously recognized under the influence of association on the contrary to the case described above. There are various kinds of illusion. For example, straight lines drawn in a radial direction over parallel lines cause the parallel lines to appear bulgy in the middle (FIG. 1), and a profile of a triangle that can not actually exist is seen (FIG. 2). Such a phenomenon referred to as illusion is a phenomenon which no electronic computer encounters. The inventor has noticed that the nature which characterizes the way of information processing specific to animals exists in such a difference.

As described above, information processing that occurs in animals including human beings is considered to be based on a different principle. From such findings obtained on human beings and the like, the inventor thought that a method for information processing having closer similarity to that in human beings and the like would not be a method wherein information is simply recorded and retrieved accurately, but it would be a method wherein individual pieces of information are "associated" (for example, a plurality of pieces of information which are incidentally input at the same time are associated with each other), and various pieces of information which have already been associated can be recalled when only one of such associated pieces of information is input as input information.

The inventor also noticed that the phenomenon of "association" is a phenomenon that is the key of activities such as thinking and language.

For example, the inventor considered that thoughts involved in solving a mathematical problem form one pattern as a whole, and an action of solving a particular mathematical problem proceeds in a way of thinking which is an association made with another problem involving a similar way of thinking.

Association in a language-related activity is as follows. For example, when an article "Fujisan" is pronounced, each of sounds "fu", "ji", "sa" and "n" is substantially simultaneously recalled in association with each other in a short period of time (simultaneity will be discussed in detail later). It is therefore considered that those four sounds are recalled substantially unconsciously. That is, when "Fujisa" is recalled, the last sound "n" is substantially "automatically" recalled as a result of association, in other words "associatively" instead of recalling each sound one by one. It is considered that this equally applies to the usage of verbs and the connection of words. For example, it is considered that words "sinogi" and "kezuru" in a chain of words "sinogi-wo-kezuru" are memorized substantially associatively and those words are unconsciously recalled as a chain of words with no attention paid to the connection between each word.

The inventor also thought that memories of driving techniques are related to association. For example, it is considered that when someone rides a bicycle or plays piano, he or she makes a series of actions continuously by recalling them associatively, e.g. he or she keeps balance of the body unconsciously without thinking or moves the fingers to produce a melody as if the fingers are "independently" moving. As apparent from those examples, the inventor conceived the present invention based on an idea that input and output of a plurality of pieces of information which are recalled in association with each other simultaneously or at some time intervals are the key factor of information processing that occurs in the central nervous system of a human being or the like. Specifically, the inventor has conceived an "association unit" which is an unit capable of "association" by associating a plurality of different pieces of information with each other and found that it is possible to create an apparatus capable of information processing having close similarity to that in the central nervous system of an animal such as a human being using such an unit.

It is an object of the invention to provide a basic unit to be used for creating an information processing apparatus capable of information processing similar to that actually occurs in the central nervous system of an animal such as a human being and to provide an apparatus including an information processing computer utilizing such an unit.

SUMMARY OF THE INVENTION

According to a first aspect of the invention, there is provided an unit for repeating input and output signals having k or more (k is an integer equal to or greater than 2) signal input terminals and a plurality of output terminals, characterized in that it comprises:

- a first repeating means for outputting an output signal having the same contents as those of a first input signal only from particular output terminals associated in advance to each of input terminals in a quantity less than k when the first input signal which is a pulse-shaped rectangular wave signal is input to the input terminals simultaneously; and
- a second repeating means for outputting an output signal having the same contents as those of a third signal from all of the output terminals when the third input signal is input to input terminals in a quantity less than k within a predetermined period of time after a second input signal is simultaneously input to the k or more input terminals.

According to a second aspect of the invention, there is provided an association unit for repeating input and output signals having signal input terminals and output terminals, characterized in that it comprises:

- a third repeating means for outputting an output signal having the same contents as those of a first input signal only from particular output terminals associated with input terminals to which the first input signal which is an analog signal having total signal strength less than a preset value $\theta$ is input; and
- a fourth repeating means for outputting an output signal having the same contents as those of a third input signal from all of the output terminals when the third input signal having total signal strength less than the preset value $\theta$ is input to the input terminals within a predetermined period of time after a second input signal having total signal strength equal to or greater than the present value $\theta$ is input to the input terminals.

According to a third aspect of the invention, there is provided an unit for repeating input and output signals having two signal input terminals and two output terminals, characterized in that it comprises:

- a fifth repeating means for outputting an output signal having the same contents as those of a first input signal only from the particular output terminal associated with one of the input terminals to which the first input signal is input; and
- a sixth repeating means for outputting an output signal having the same contents as those of a third input signal from both of the output terminals when the third input signal is input to only one of the input terminals within a predetermined period of time after a second input signal is input to the two input terminals.

According to a fourth aspect of the invention, there is provided an apparatus characterized in that it comprises one or a plurality of units connected to each other according to the first, second or third aspect of the invention.

According to a fifth aspect of the invention, there is provided an information processing apparatus having a signal input terminals and an output terminal wherein an input signal is input to the input terminal and a predetermined output signal is output from the output terminal, characterized in that the predetermined output signal is output from the output terminal when only a part of the input signal is input to the input terminal within a predetermined period of time after the input signal is input.

According to a sixth aspect of the invention, there is provided a method for association in a repeating apparatus for repeating input and output signals having k or more (k is an integer equal to or greater than 2) signal input terminals and a plurality of output terminals, characterized in that it comprises:

- a first repeating step for outputting an output signal having the same contents as those of a first input signal only from particular output terminals associated in advance to each of input terminals in a quantity less than k when the first input signal which is a pulse-shaped rectangular wave signal is input to the input terminals simultaneously; and
- a second repeating step for outputting an output signal having the same contents as those of a third signal from all of the output terminals when the third input signal is input to input terminals in a quantity less than k within a predetermined period of time after a second input signal is simultaneously input to the k or more input terminals.

According to a seventh aspect of the invention, there is provided a method for association in a repeating apparatus for repeating input and output signals having signal input terminals and output terminals, characterized in that it comprises:

- a third repeating step for outputting an output signal having the same contents as those of a first input signal only from particular output terminals associated with input terminals to which the first input signal which is an analog signal having total signal strength less than a preset value $\theta$ is input; and
- a fourth repeating step for outputting an output signal having the same contents as those of a third input signal from all of the output terminals when the third input signal having total signal strength less than the preset value $\theta$ is input to the input terminals within a predetermined period of time after a second input signal having total signal strength equal to or greater than the present value $\theta$ is input to the input terminals.

According to an eighth aspect of the invention, there is provided a method for association in an repeating apparatus for repeating input and output signals having two signal input terminals and two output terminals, characterized in that it comprises:

- a fifth repeating step for outputting an output signal having the same contents as those of a first input signal only from the particular output terminal associated with one of the input terminals to which the first input signal is input; and
- a sixth repeating step for outputting an output signal having the same contents as those of a third input signal from both of the output terminals when the third input signal is input to only one of the input terminals within a predetermined period of time after a second input signal is input to the two input terminals.

According to a ninth aspect of the invention, there is provided a method for association characterized in that it comprises the step of carrying out the method for association according to the sixth, seventh or eighth aspect of the invention once or a plural times.

According to a tenth aspect of the invention, there is provided a method for processing information in a processing apparatus having a signal input terminals and an output terminal wherein an input signal is input to the input terminal and a predetermined output signal is output from the output terminal, characterized in that the predetermined output signal is output from the output terminal when only a part of the input signal is input to the input terminal within a predetermined period of time after the input signal is input.

BRIEF DESCRIPTION OF THE INVENTION

FIG. 23 illustrates a 10×10 pixel matrix as an input signal.

DETAILED DESCRIPTION OF PREFERRED EMBODIMENT

A preferred embodiment of the present invention will now be described with reference to the accompanying drawings.

A basic structure of an unit 10 according to the present invention will be first described with reference to FIGS. 3 through 7.

Figure 1:
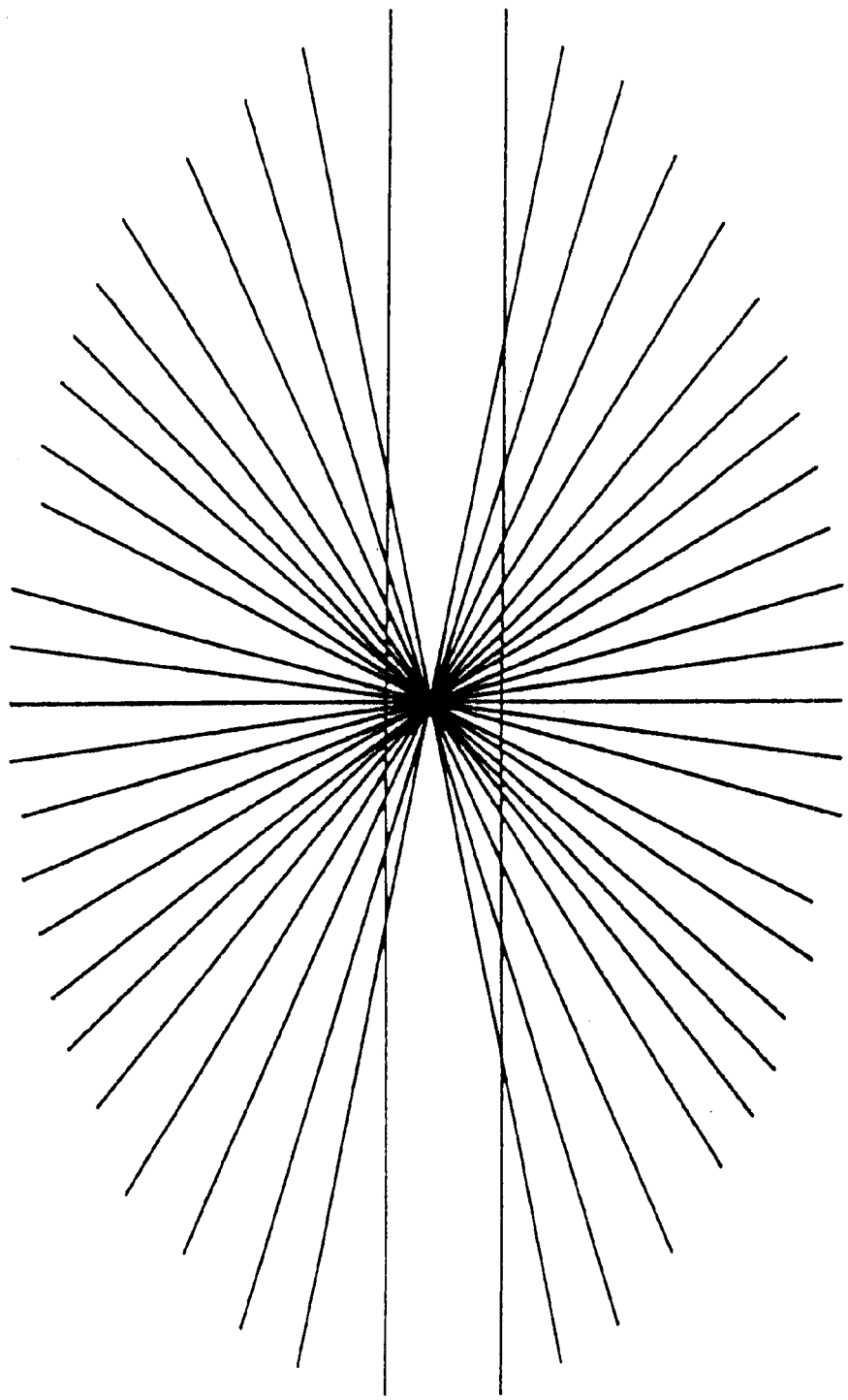
FIG. 1 shows an example of optical illusion.
Figure 2:
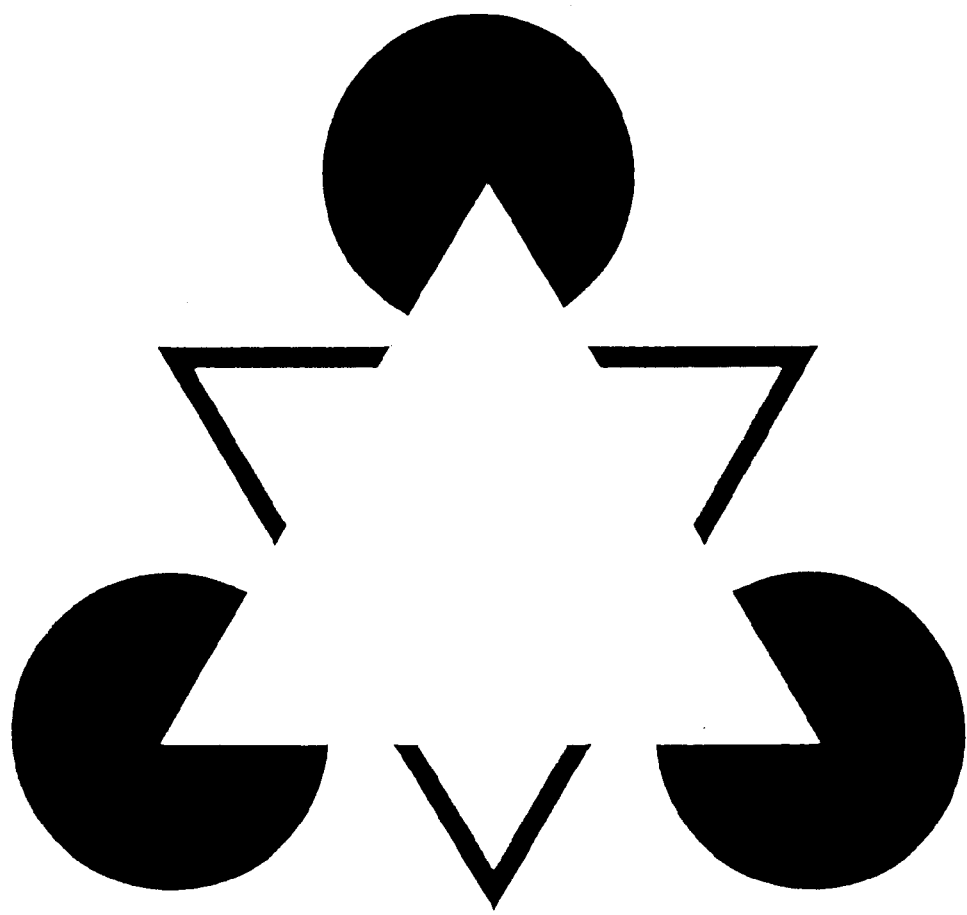
FIG. 2 shows another example of optical illusion.
Figure 3:
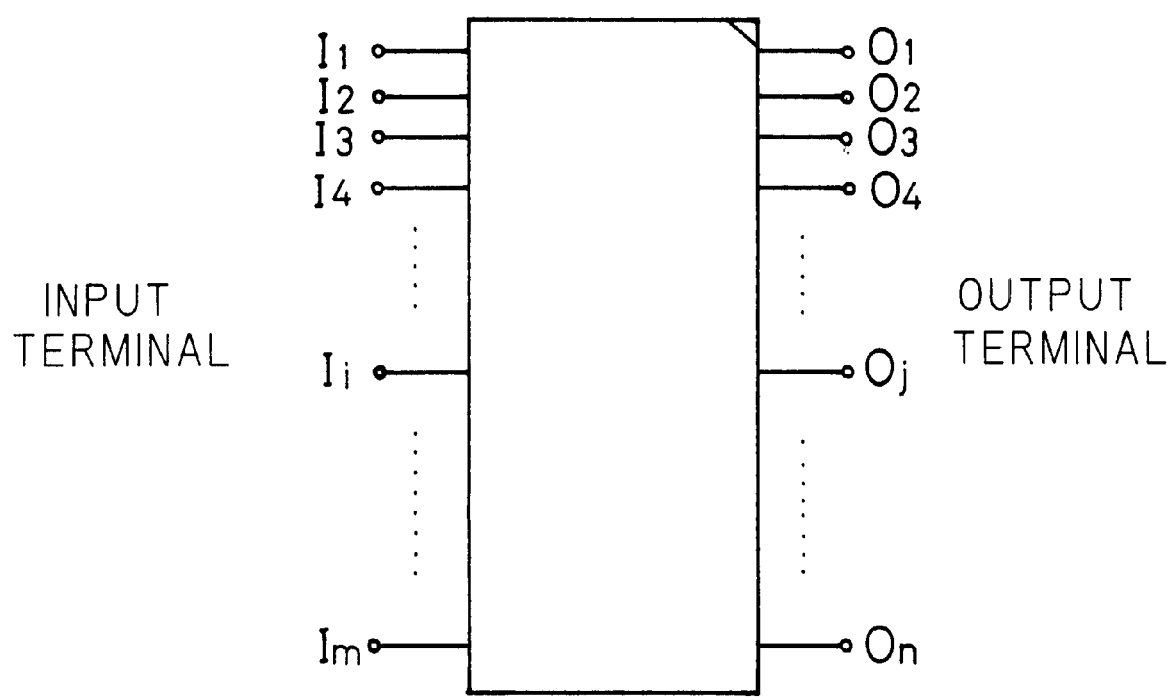
FIG. 3 illustrates an m·n·unit.
Figure 4:
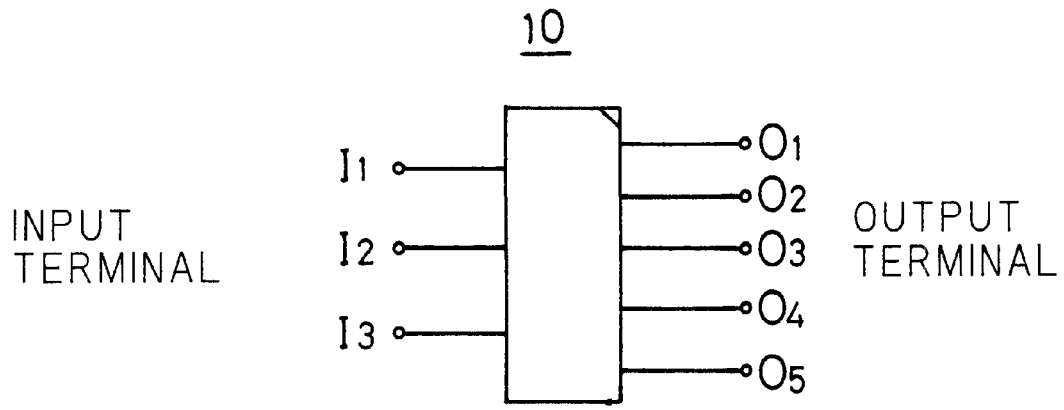
FIG. 4 illustrates a 3·5 unit.
Figure 5:
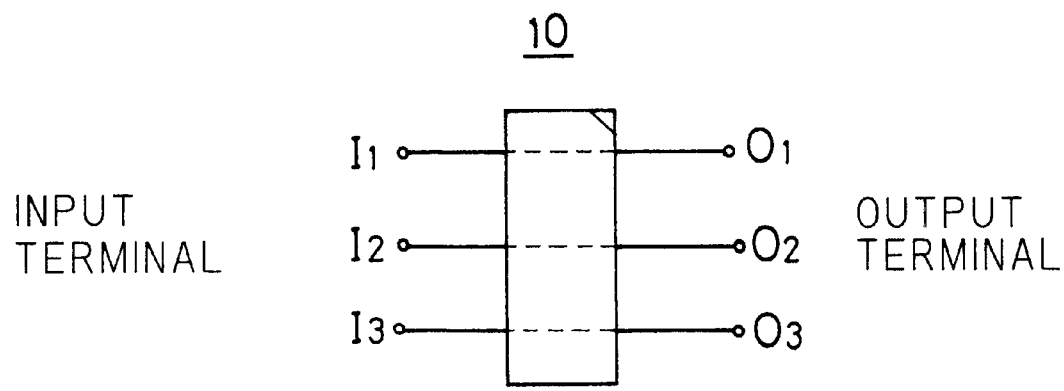
FIG. 5 illustrates a relationship of direct output.

The association unit 10 according to the invention includes m input terminals $I_1, I_2, I_3, \ldots I_i$ ($1 \leq i \leq m$) to which input signals are input and n output terminals $O_1, O_2, O_3, \ldots, O_j$ ($1 \leq j \leq n$) which outputs output signals. Such an unit having m input terminals and n output terminals is referred to as "m·n unit" and represented as shown in FIG. 3. An unit has an oblique line in its upper right corner which indicates an output side thereof. The time indicated on an unit represents an association retention time (which will be described later and which is 15 minutes for the unit shown in FIG. 3). For example, a "3·5 unit" is an unit having three input terminals $I_1, I_2$ and $I_3$ and five output terminals $O_1, O_2, O_3, O_4$ and $O_5$ (FIG. 4).

A description will now be made with reference to FIGS. 5 through 15 on a case wherein a pulse signal (rectangular wave) is input to an unit.

When an input signal is input to an unit, an output signal is output from an output signal having the same number as that of the input terminal to which the signal is input. For example, in the case of a 3·3 unit, a signal input to an input terminal $I_1$, is output from an output terminal $O_1$ as an output signal. Similarly, signals input to input terminals $I_2$ and $I_3$ are output from output terminals $O_2$ and $O_3$ respectively as output signals.

Figure 6:
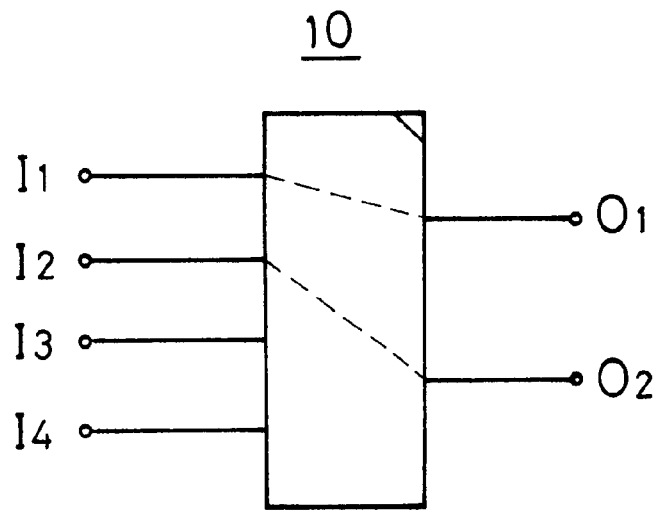
FIG. 6 illustrates a relationship of direct output in a 4·2 unit.

Thus, input and output terminals are in one-to-one correspondence to each other and, when an input signal is input to an unit, an output signal is output only from a particular output terminal corresponding to the input terminal to which the input signal is input. Such an output is referred to as "direct output", and such a signal is referred to as "direct output signal". A state of an unit wherein it provides such a direct output in one-to-one correspondence is referred to as "idle state". When the number of the input terminals (m) of an association unit (m·n·unit) in the idle state is equal to the number of the output terminals (n) (i.e., when m=n), all of the input an out put terminals are in one-to-one correspondence. When the number, of the input terminals is greater than the number of the output terminals (m>n), some of the input terminals correspond to no output terminal. There will be no direct output when a signal is input to such an input terminal in an unit in the idle state. For example, in the case of a 4·2 unit (in the idle state), input terminals $I_1$ and $I_2$ respectively correspond to output terminals $O_1$ and $O_2$, but input terminals $I_3$ and $I_4$ correspond to no output terminal. Therefore, when input signals are input to the input terminals $I_3$ and $I_4$, this unit provides no direct output (FIG. 6). In this case, the input terminals $I_3$ and $I_4$ are referred to as "blind inputs".

Figure 7:
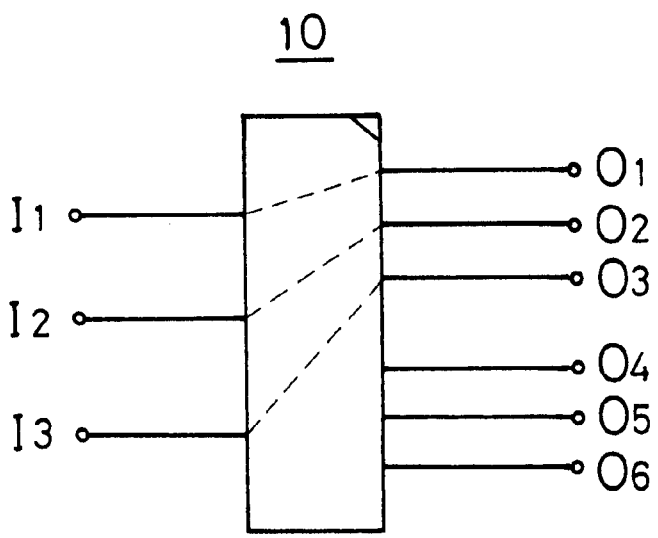
FIG. 7 illustrates a relationship of direct output in a 3·6 unit.
Figures 8A, 8B:
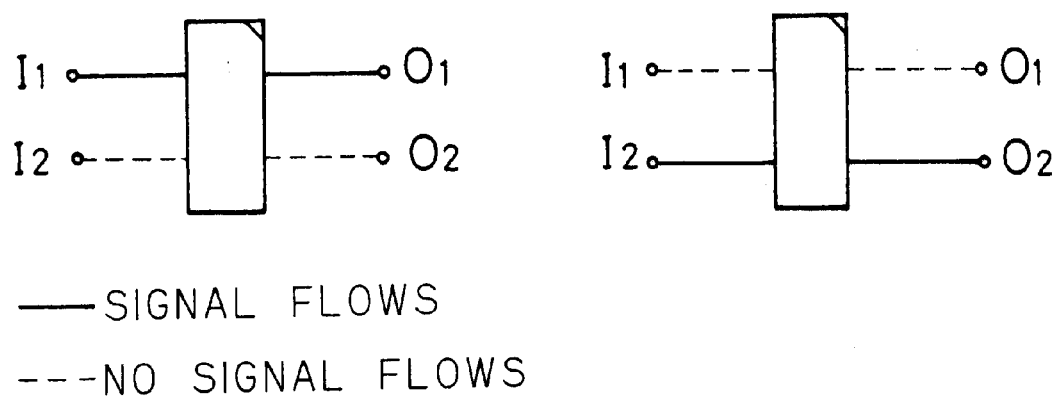
FIGS. 8A and 8B illustrate a relationship of direct output in a 2·2 unit in an idle state.

When the number of the input terminals is smaller than the number of the output terminals (m<n), some of the output terminals correspond to no in put terminal. Such output terminals of an unit in the idle state provide no direct output when a signal is input to an input terminal. For example, in the case of a 3·6 unit (in the idle state), input terminals $I_1, I_2$ and $I_3$ respectively correspond to output terminals $O_1, O_2$ and $O_3$, but output terminals $O_4, O_5$ and $O_6$ correspond to no input terminal. Therefore, those output terminals provide no direct output (FIG. 7). In this case, the output terminals $O_4, O_5$ and $O_6$ are referred to as "blind outputs".

Figures 9A, 9B:
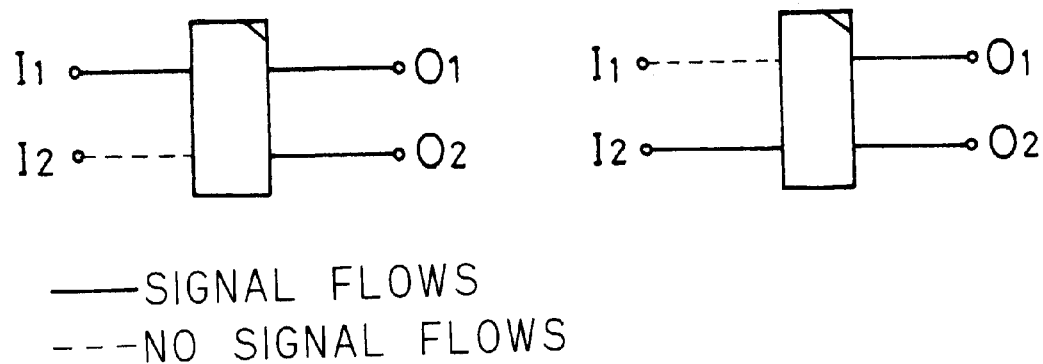
FIGS. 9A and 9B illustrate the flow of a signal in a 2·2 unit is an active state.
Figure 10:
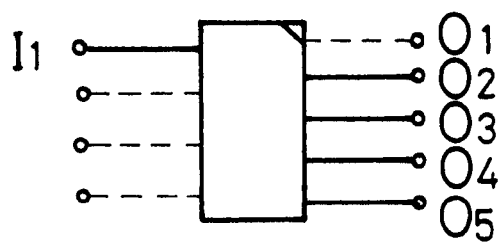
FIG. 10 illustrates the flow of a signal in a 4·5 unit (k=2) is an active state.

When a plurality of input signals are input to an association unit in the idle state, if the number of pulse signals which are regarded as having being input simultaneously among pulse signals in put to respective terminals of the association unit, i.e., the number of the input terminals to which input signals have been input simultaneously (this number is represented by N) is equal to or greater than a value k preset for the unit ($2 \leq k \leq m$) (k is referred to as "activation threshold number" and is a constant specific to each unit), the association unit provides not only direct output corresponding to the input signals but also output signals from all output terminals. Such a state of an unit is referred to as "active state", and transition from the idle state t o the active state is referred to as "activation". An unit which has been activated outputs signals from all output terminals thereof including blind output terminals for a predetermined period of time even if the number of input terminals to which input signals are simultaneously input does not satisfies $N \geq k$, e.g., even if an input signal is input to only one input terminal. In such a case, output from output terminals (including blind terminals) other that output terminals outputting direct output signals is referred to as "indirect output", and such Specifically, a blind output terminal outputs an indirect output signal only when the unit is activated. For example, a 2·2 unit (k=2) which is the most basic unit provides only a direct output from $O_1$ (FIG. 8A) or $O_2$ (FIG. 8B) in response to inputs to $I_1$ or $I_2$ in the idle state. When input signals are input to $I_1$ and $I_2$ simultaneously to activate the unit, however, output signals are output from both of $O_1$ and $O_2$ in response to the input to $I_1$. In this case, the output signal from $O_1$ is a direct output whereas the output signal from $O_2$ is an indirect output (FIG. 9A). Output signals are output from both of $O_1$ and $O_2$ in response to an input to $I_2$ (FIG. 9B). In the case of a 4-5 unit (k=2), if input signals are simultaneously input to two or more of input terminals $I_1, I_2, I_3$ and $I_4$, the association unit is activated and, in the activated state, outputs output signals from all output terminals in response to input to even only one terminal (FIG. 10).

An activated state of an association unit lasts for a predetermined period of time. Such a duration is referred to as "association retention time" and is represented by "T". The association retention time is a value specific to each association unit and may be set at 30 seconds, one hour, one year, infinity or the like for each association unit. Such a value is indicated by putting a marking on an upper part of each unit if necessary (see FIG. 4).

Figure 11:
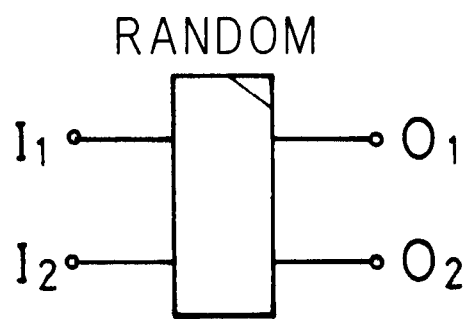
FIG. 11 illustrates notation in a 2·2 unit having a random association retention time.
Figure 12:
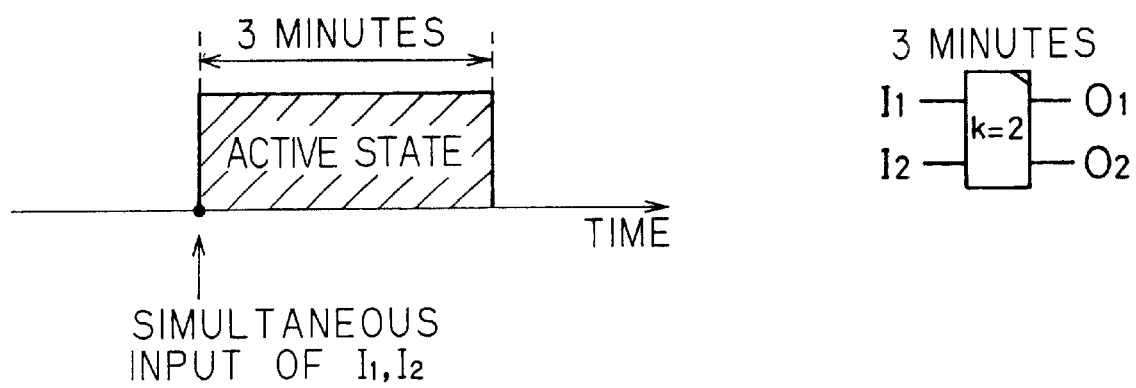
FIG. 12 is a schematic illustration of an association retention time of a 2·2 unit (T=3 min.).

The association retention time of an association unit may be set such that it varies on a random basis each time the association unit is activated. In this case, a marking "random" is put on the unit. This makes it possible to introduce unpredictability to an apparatus (FIG. 11). The association retention time may be set such that it varies in proportion to pulse widths of input signals which can be regarded simultaneous.

Further, the association retention time may be set so as to dynamically vary. In such a case, the unit is regarded as having "a dynamic association retention time". For example, where simultaneous input signals are frequently received in a repetitive fashion, the association retention time T may be defined as a monotonously increasing function that increases depending on the number $\phi$ of the inputs of simultaneous input signals as expressed by:

$$T = T_0 \phi^{1/2} \qquad \text{Equation 1}$$

where $T \geq 0$, and $\phi$ is a positive integer. $T_0$ is the value of T when $\phi=1$ and will be referred to as "initial association retention time". An association retention time which is fixed will be referred to as "fixed association retention time" as opposed to "dynamic association retention time". Further, the dynamic association retention time may be defined as a function of a time interval φ between inputs of simultaneous input signals instead of the number of occurrence of simultaneous input signals φ as expressed, for example, by:

$$T=T0/\phi(\phi>0) \qquad \text{Equation 2}$$

Further, the association retention time of an unit which has already been activated can b e extended in response to a single input signal instead of simultaneous input signals because it outputs an indirect output signal which functions with the aid of a feedback mechanism as if it is a weak simultaneous input signal. Such a variation of an association retention time is referred to as "reverberation-dependent association retention time". This is analogous to the fact that one can keep a memory for a longer period of time if he or she recalls the memory repeatedly.

Figure 13:
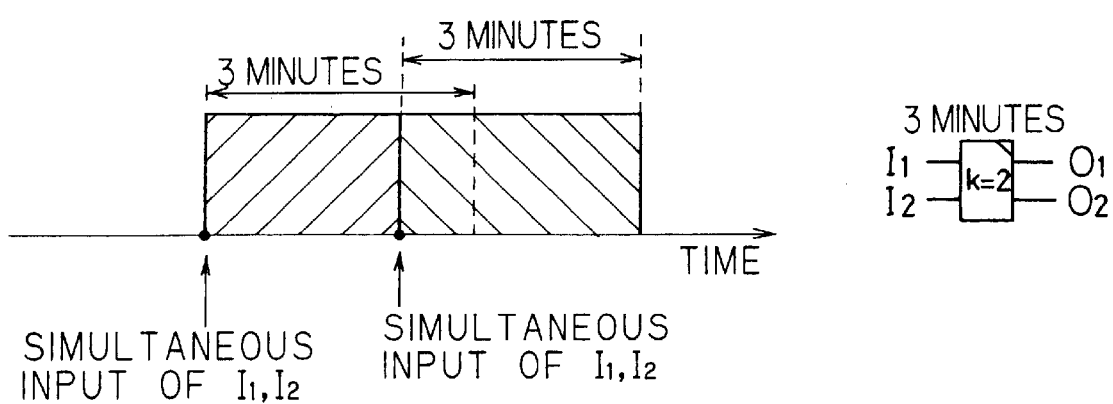
FIG. 13 is a schematic illustration of extension of an association retention time of a 2·2 unit (T=3 min.).

As a result, for example, a phenomenon that a person can keep a memory of a painting for a considerably long period when he or she has kept watching the picture for a prolonged period of time can be established in an unit. After a predetermined association retention time expires, an unit returns from the active state to the idle state in which no direct output is provided. However, when an association unit receives signals at input terminals in a quantity equal to or greater than the activation threshold number set for the association unit, i.e., when input signals that satisfy the condition for activation are input again before the retention time expires, the association retention time starts again, i.e., is set again at such a point in time. This further prolongs the association retention time. For example, when a 2-unit (k=2 and, for example, T=3) is in the active state, this association unit returns to the idle state 3 minutes later (FIG. 12) if an input signal is input to only one of input terminals $I_1$ and $I_2$ within the association retention time (which is 3 minutes in this example). On the contrary, if input signals are input to the input terminals $I_1$ and $I_2$ simultaneously within the association retention time (i.e., if there is an input equal to or greater than the activation threshold number), the association retention time is further extended by three minutes at that point in time (FIG. 13).

The association retention time may be set based on probability. For example, let us assume that the probability that a certain unit is in the active state at a point in time t is represented by P(t) which is a function of t where $0 \leq P(t) \leq 1$. Then, P(t) may be regarded as the probability that the unit is in its association retention time. For example, it may be defined as a monotonous decreasing function as follows.

$$P(t)=\exp[-\alpha t] \qquad \text{Equation 3}$$

In this case, the constant α is specific to each unit and will be referred to here as "association decay coefficient". The constant α may also be considered as dynamic as may be used as a constant which is a function of the time interval φ as described above spent before the next simultaneous input signals expected to be input or the number of occurrence of the simultaneous input signals φ as described above to provide "dynamic association retention time" as described above.

Figure 14:
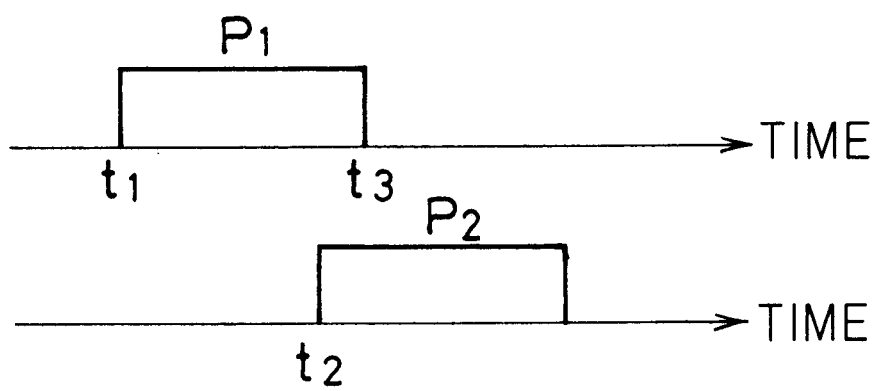
FIG. 14 illustrates a pulse signal $P_1$ and a pulse signal $P_2$ which are in complete coincidence.
Figure 15:
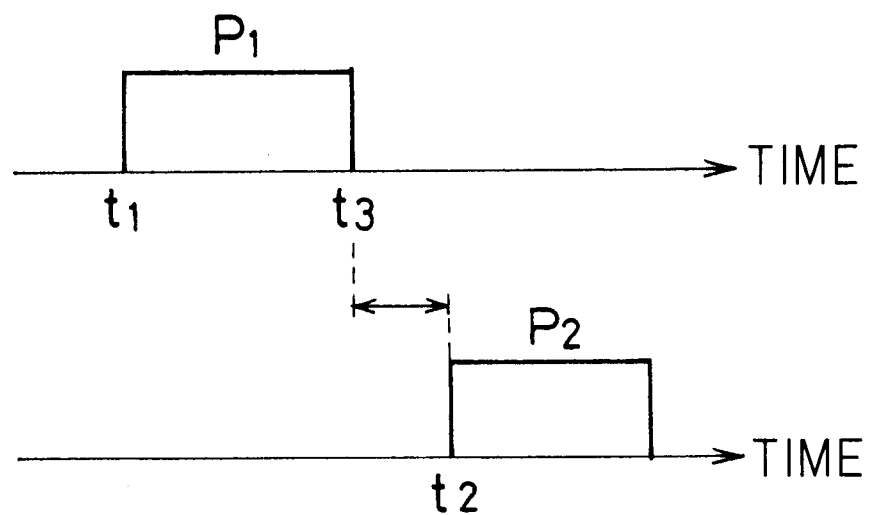
FIG. 15 illustrates the pulse signal $P_1$ and the pulse signal $P_2$ which are in incomplete coincidence.

The number of input terminals to which simultaneous input signals are input is a factor associated with the activation of an association unit. The term "simultaneous" is defined here as follows. Let us assume here that the first one of two pulse signals input to separate input terminals of an association unit is represented by $P_1$; the second pulse signal is represented by $P_2$; the pulse width of the pulse signal is from a point in time $t_1$ to a point in time $t_3$; and the pulse signal $P_2$ is input from the point in time $t_2$. If a condition that $t_1 \leq t_2 \leq t_3$ is satisfied here, the pulses $P_1$ and $P_2$ are regarded "simultaneous" because they partially or entirely overlap each other in terms of the time base, and simultaneity under such a condition is referred to as "complete coincidence" (FIG. 14). Next, when $t_3<t_2$ the pulses $P_1$ and $P_2$ do not overlap each other in terms of the time base. However, if a constant τ specific to an association unit is set and if $t_2-t_3 \leq \tau$, the pulses $P_1$ and $P_2$ are regarded "simultaneous" and simultaneity under such a condition is referred to as "incomplete coincidence" (FIG. 15). The constant τ is referred to as "delay-permissible time". The conditions for "complete coincidence" and "incomplete coincidence" are combined into a condition expressed by the following equation.

$$t_2 \leq t_3+\tau \qquad \text{Equation 4}$$

where $t_3$ represents the point in time at which the input of the preceding pulse signal $p_1$ is terminated and $t_2$ represents the point in time at which the input of the subsequent input pulse signal $p_2$ is started. Since the pulse $P_1$ always precedes the pulse $P_2$ by definition, $t_1<t_2$ is always true. Further, a point in time at which an association unit recognizes simultaneity is referred to as "association starting point".

By setting such an "allowable delay time", it is possible to provide anassociation unit with a property which is similar to that of association in a human being in that, for example, two events can be recalled through association even if the two events occur with some time lag instead of occurring simultaneously provided that the time lag is small.

Figure 16:
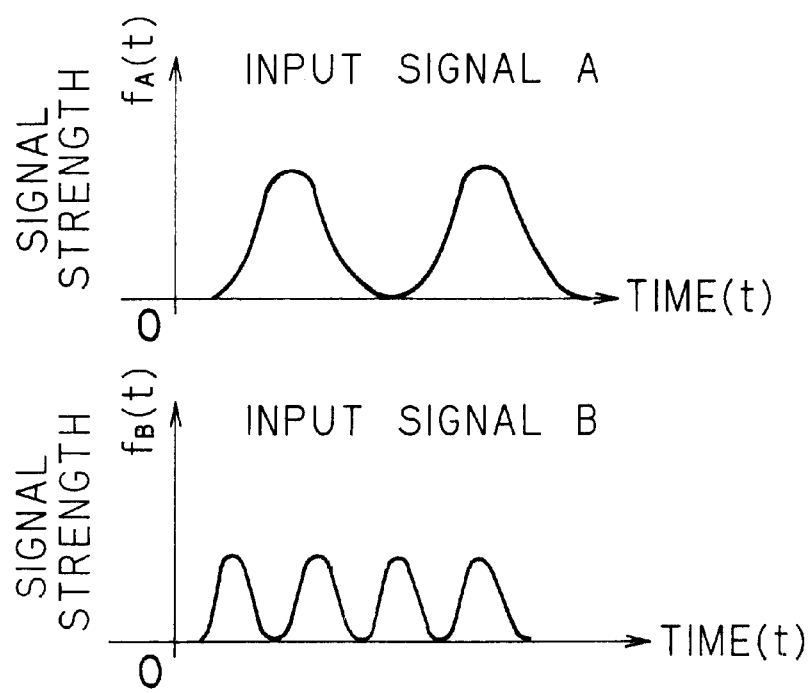
FIG. 16 illustrates an input signal A and an input signal B which are both analog signals.

A description will now be made with reference to FIGS. 16 and 17 on a case wherein analog signals are input to an unit.

In the case discussed here, the input signals are analog signals. An association unit is activated when the sum of the strength of input signals input to different input terminals in the form of a plurality of analog signals is equal to or greater than a value θ present for the association unit (the value θ is hereinafter referred to as "activation threshold").

For example, when an input signal A (which is assumed here to be a function $f_A(t)$ whose variable is time (t)) and an input signal B (which is assumed here to be a function $f_B(t)$ whose variable is time t) are input to different input terminals of an association unit (FIG. 16), the association unit is activated (FIG. 17) if the sum of the strength of the input signals is equal to or greater than the activation threshold θ, i.e., if:

$$f_A(t)+f_B(t) \geq \theta \qquad \text{Equation 5}$$

Figure 17:
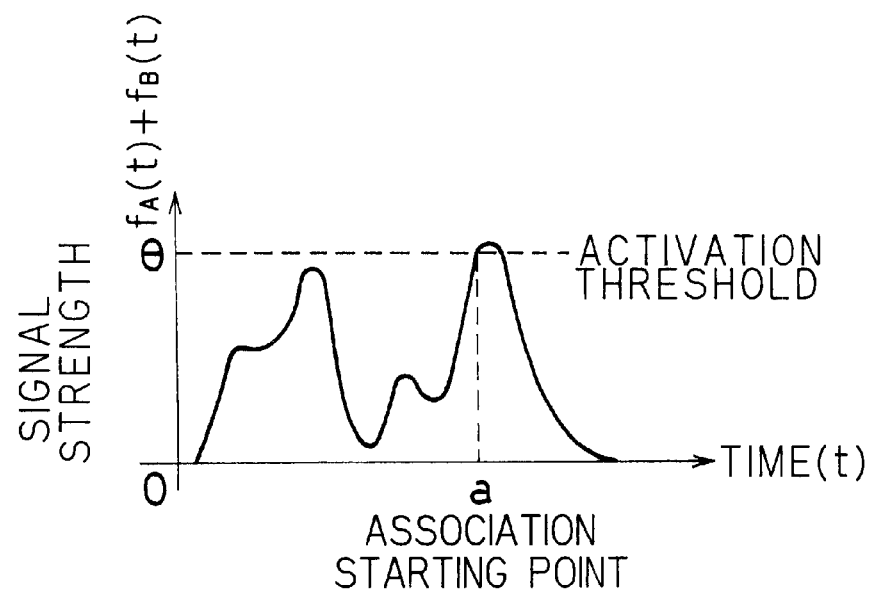
FIG. 17 illustrates the relationship between the sum of the signal strength of the input signals A and B and an activation threshold (θ).

That is, in the example shown in FIG. 17, activation occurs at a point in time t=a which serves as the association starting time. It has been described that the association starting time is a point in time at which the number of input terminals to which input signals are input simultaneously becomes equal to or greater than the activation threshold when the input signals are pulse signals. In the case of analog signals, however, the definition of "simultaneity" does not apply thereto and, therefore, the association starting point is defined as a point in time at which the sum of strength of the input signals becomes equal to or greater than the activation.

When input signals A and B each having signal strength lower than the activation threshold are input to separate input terminals of an association unit, in order for the sum of strength of the input signals to be equal to or greater than the activation threshold, the two input signal must partially or entirely overlap each other in terms of the time base, which corresponds to simultaneity in the case of pulse signals. In the case of analog signals, however, the association unit is not activated even if the input signals A and B overlap each other where the sum of signal strength is not equal to or greater than the activation threshold. On the contrary, the association unit is activated by only one input signal instead of a plurality of input signals if the strength of the signal is equal to or greater than the activation threshold. This is a property characteristic of analog signals which can not be seen when the input signals are pulse signals.

While the association retention time can be set similarly to the case of pulse signals, the association retention time may be set such that it varies in proportion to the strength of input signals. This corresponds to a phenomenon that a strong stimulus to a human being, e.g., an experience of being caught by a door in his or her finger can be kept in the person's memory possibly for life even through it is only an instantaneous experience.

Thus, when analog signals are input to an association unit, it has characteristics somewhat different from those resulting from pulse signals. However, the same basic characteristics of an association unit still remain in that an association unit is activated in response to the input of a plurality of input signals satisfying a certain condition and in that an output signal having the same contents as those of the input signal is output by all output terminals of the unit in the active state having a predetermined duration (i.e., during an association retention time) even when only one input signal is input.

A description will now be made with reference to FIGS. 18A through 30 on a case wherein a plurality of association units are connected.

Figure 18A:
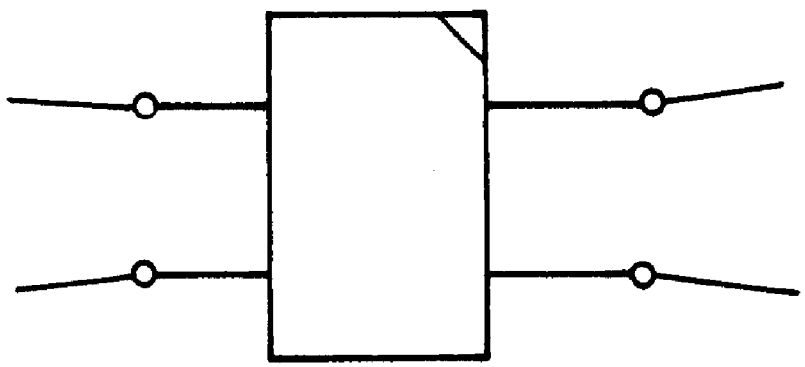
FIGS. 18A and 18B illustrate the connection of a signal to each terminal.
Figure 18B:
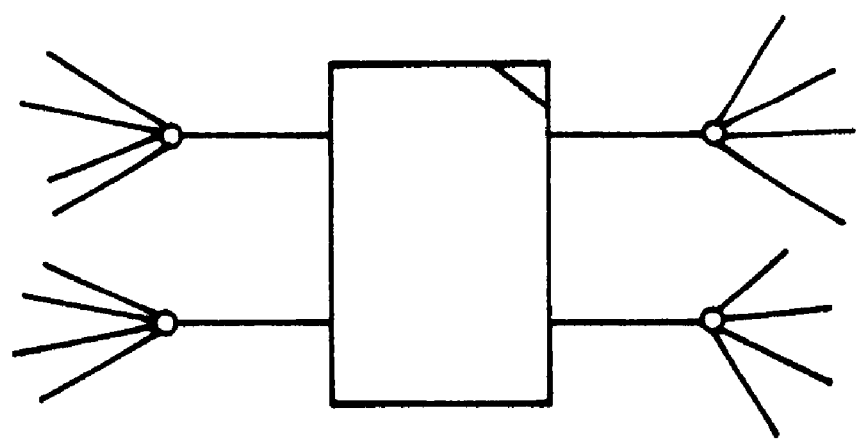

A plurality of such association units may be prepared and connected to each other at their respective input and output terminals to cause signals to flow therethrough. A circuit formed by connecting association units as described above is referred to as "association circuit". Further, a complicated network can be constructed using circuits. This is referred to as "association unit network", and an apparatus that utilizes association units, circuits and an network is referred to as "association apparatus". Referring to connection between association units, a single terminal may be connected to another single terminal (FIG. 18A), and a single terminal may be connected to a plurality of terminals (FIG. 18B).

Definitions of properties of signals will now be given to allow a precise discussion. It is assumed here that a particular input signal (e.g., an image of an apple, a sound of an instrument or the like) is comprised of a plurality of signals (information); such a group of signals are referred to as "signal set"; and each component that forms a part of a signal set is referred to as "signal unit". For example, an entire image of an apple projected on a television camera is a signal set (input signal set), and each of the pixels thereof is a signal unit. Similarly, a single sound of a piano produced when a particular key is hit forms a signal set, and the signal strength of each of frequency components obtained by decomposing the sound is a signal unit. The greater the number of signal units forming a particular signal set, the signal set is regarded as having a "higher resolution".

An output signal is similarly formed by signal units, and output signals collectively form a particular output signal set.

Figure 19:
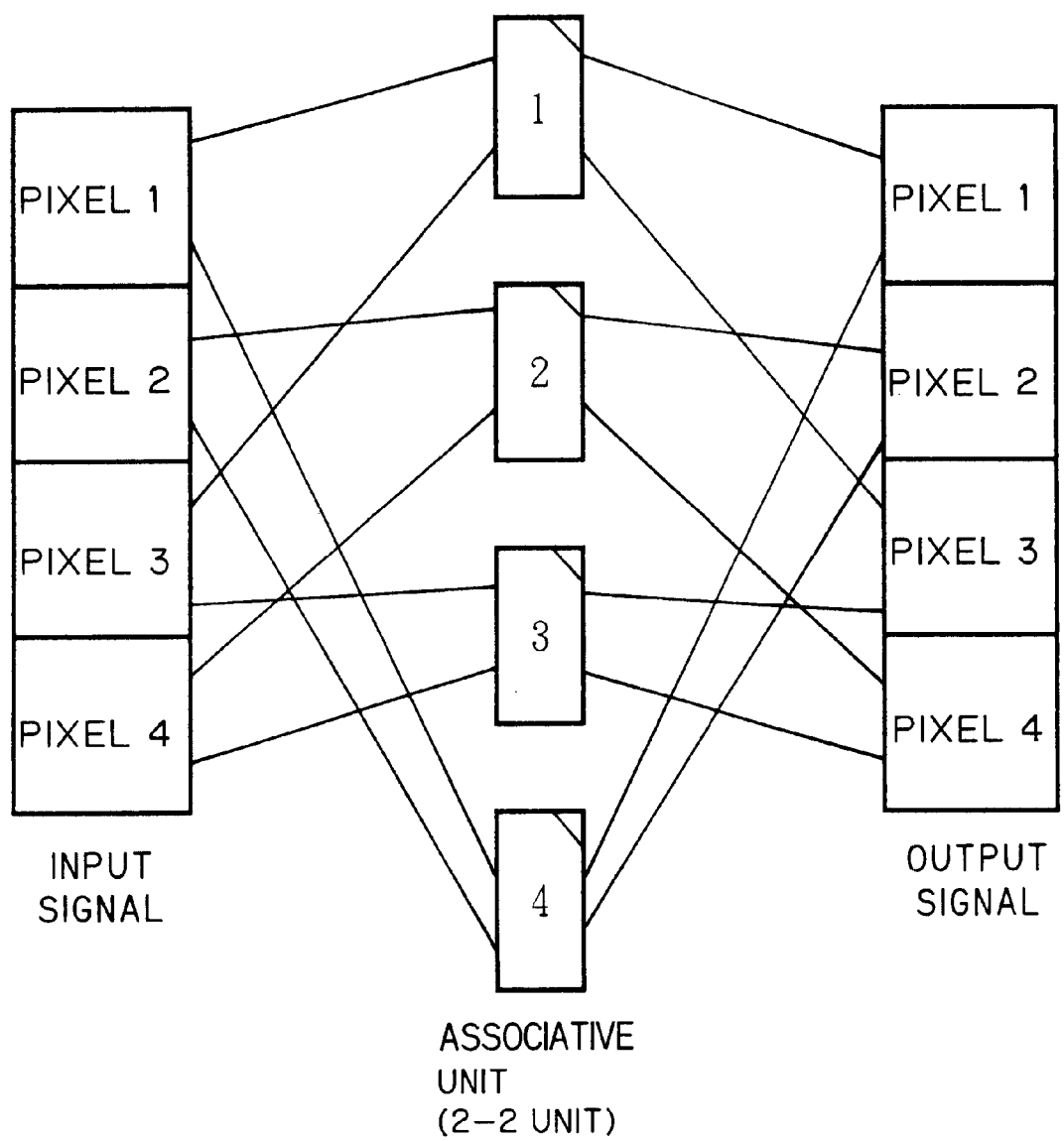
FIG. 19 is a schematic illustration of the flow of signals through four units.
Figure 20:
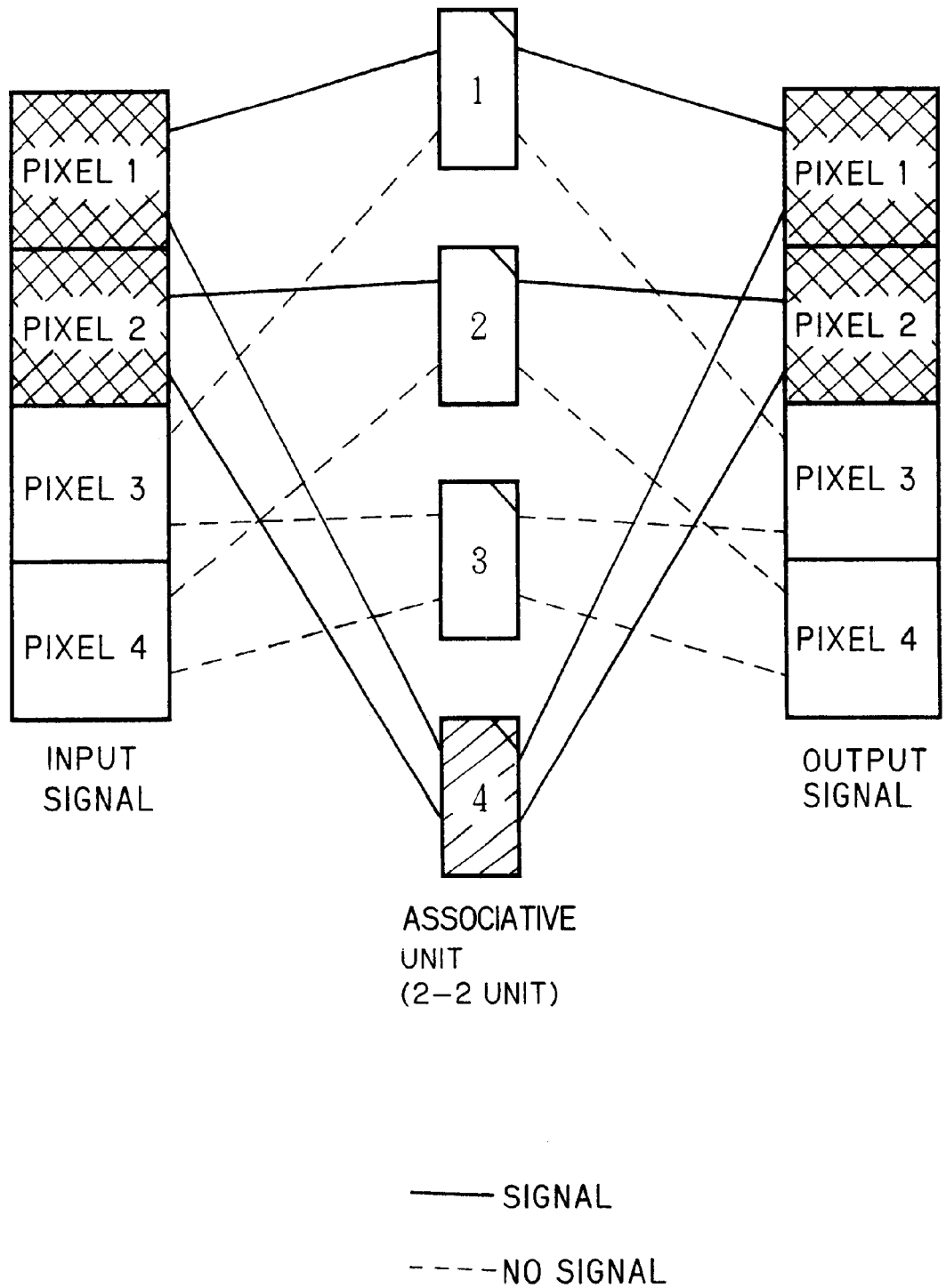
FIG. 20 is a schematic illustration of the flow of signals input from a pixel 1 and a pixel 2 simultaneously.
Figure 21:
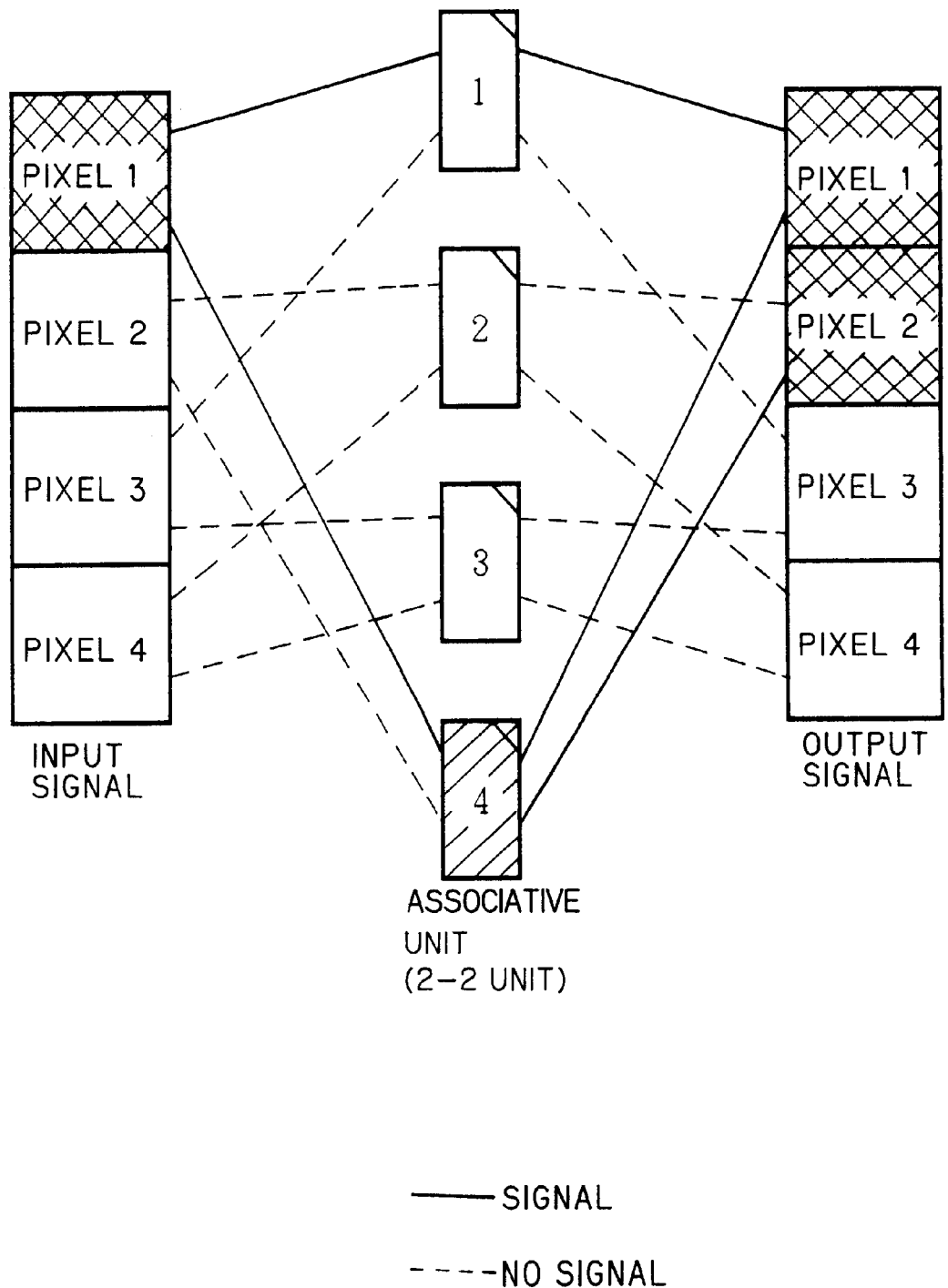
FIG. 21 is a schematic illustration of the flow of a signal input from the pixel 1 in an active state.

To describe the operation of a plurality of association units clearly, an image processing apparatus will now be discussed wherein an image signal consisting of four pixels is input as an input signal; a pixel signal from each of the four pixels (pixels 1, 2, 3 and 4) is connected to input terminals of four 2·2 (units 1, 2, 3 and 4); and output terminals of the 2·units are connected to output signals (pixels 1, 2, 3 and 4) such that they are in the same position as the input pixels. FIG. 19 is a schematic view of this image processing apparatus. When the pixel signals from the pixels 1 and 2 are simultaneously input to the unit 4 (FIG. 20), the unit 4 is activated (this is represented in FIG. 20 by an unit marked with oblique lines) and output signals are output to the pixels corresponding to the pixels 1 and 2.

Figure 22:
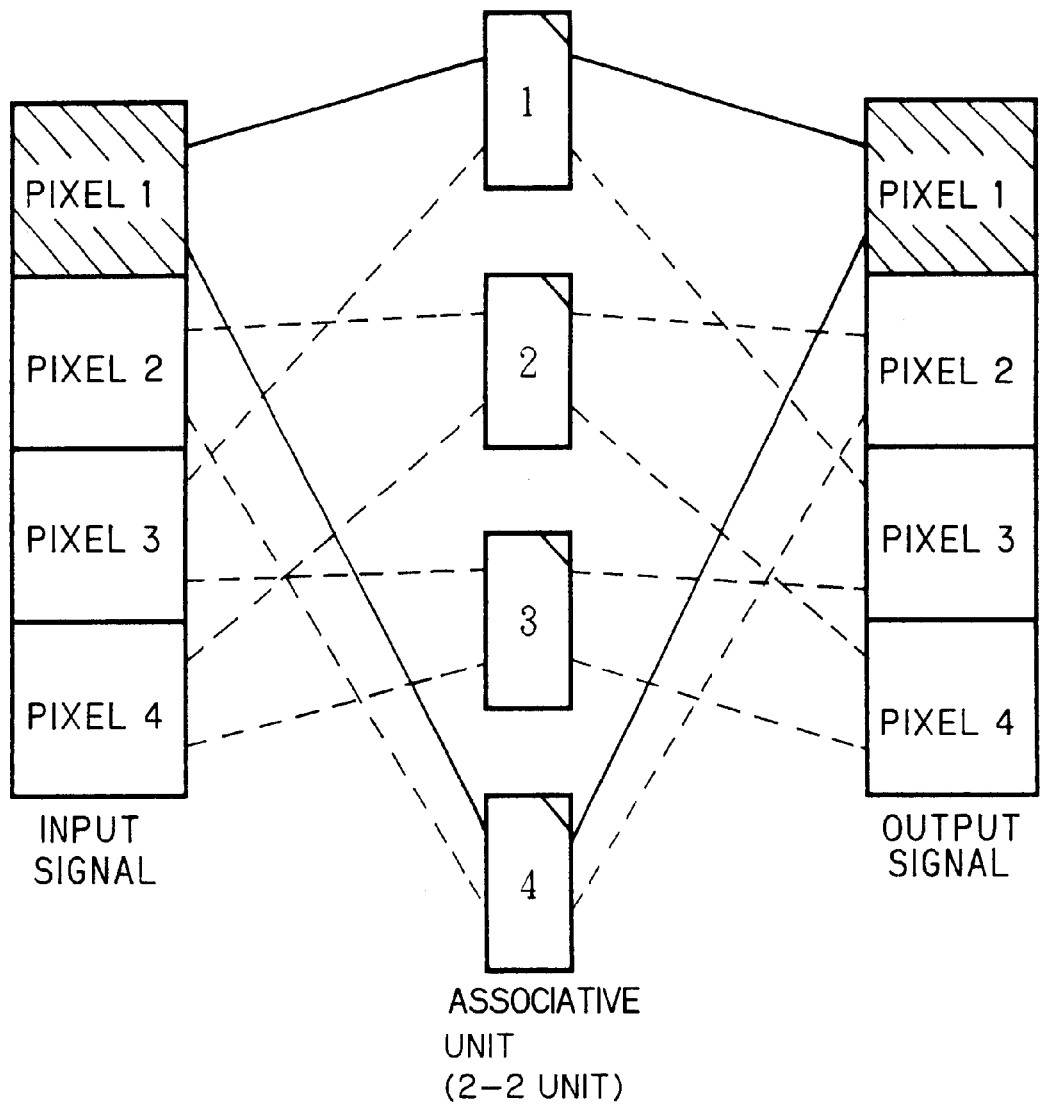
FIG. 22 is a schematic illustration of the flow of a signal input from the pixel 1 after an active state.

Next, if only the pixel signal from the pixel 1 is input while the unit 4 is in the active state (FIG. 21), as a result of an operation of the unit 4 in the active state, output signals are output not only to the pixel 1 which is originally associated with the pixel signal but also to the pixel 2 despite the fact that only the pixel 1 has the input. However, after the association retention time of the unit 4 expires, the output signal is output only to the pixel 1 and not to the pixel 2 when only the pixel signal from the pixel 1 is input because the unit 4 is no longer in the active state (FIG. 22).

Next, let us consider pixel signals from a matrix of 10×10 pixels (100 pixels in total) as an input signal (FIG. 23). While the pixel signals from the 100 pixels are input to the input terminals of a plurality of 2·2, $_{100}C_2$=4,950 2·2 units are used and connected in order to obtain all combinations of extraction of two pixels from the 100 pixels. Each of those 2·2 is indicated by numbers given thereto such as unit (1, 2), unit (1, 3), . . . , unit (98, 100) and unit (99, 100). The association retention time of each unit is randomly set within the range from 10 minutes to 2 hours.

Figure 24:
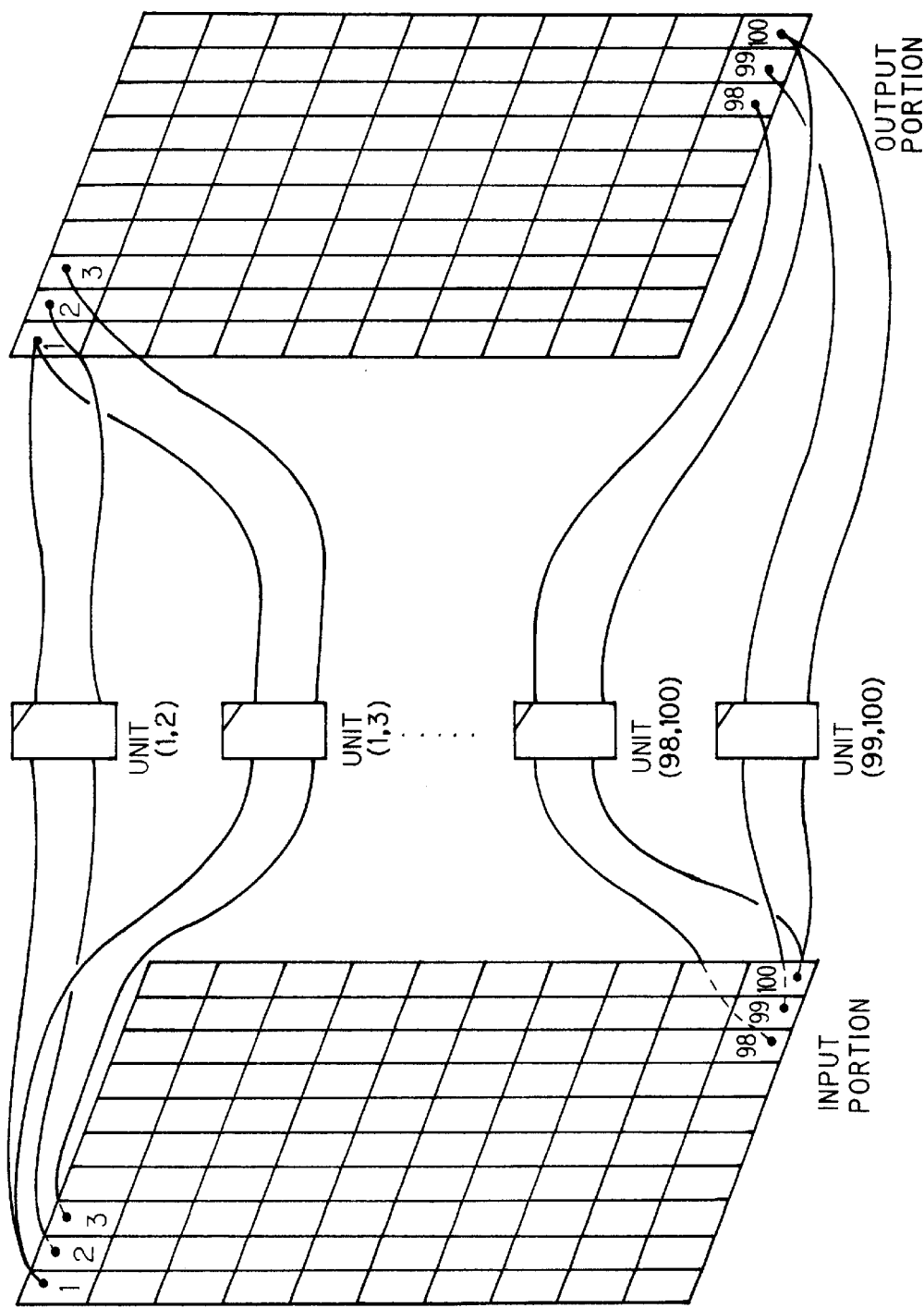
FIG. 24 illustrates the connection between the 10×10 pixel matrix, 2·2 units and a pixel matrix for outputting an image.

Next, the output terminals of those 2·2 units are all connected to 10×10 pixels (100 pixels in total), and the connection is made such that complete positional coincidence with the pixels an input signals is maintained. For example, a signal from a pixel 1 is input to a pixel 1 in the same position through the 2·2 units (FIG. 24). Further, in most cases, a signal from a single pixel is connected to a plurality of units (see the pixel 1 in FIG. 24).

Figure 25:
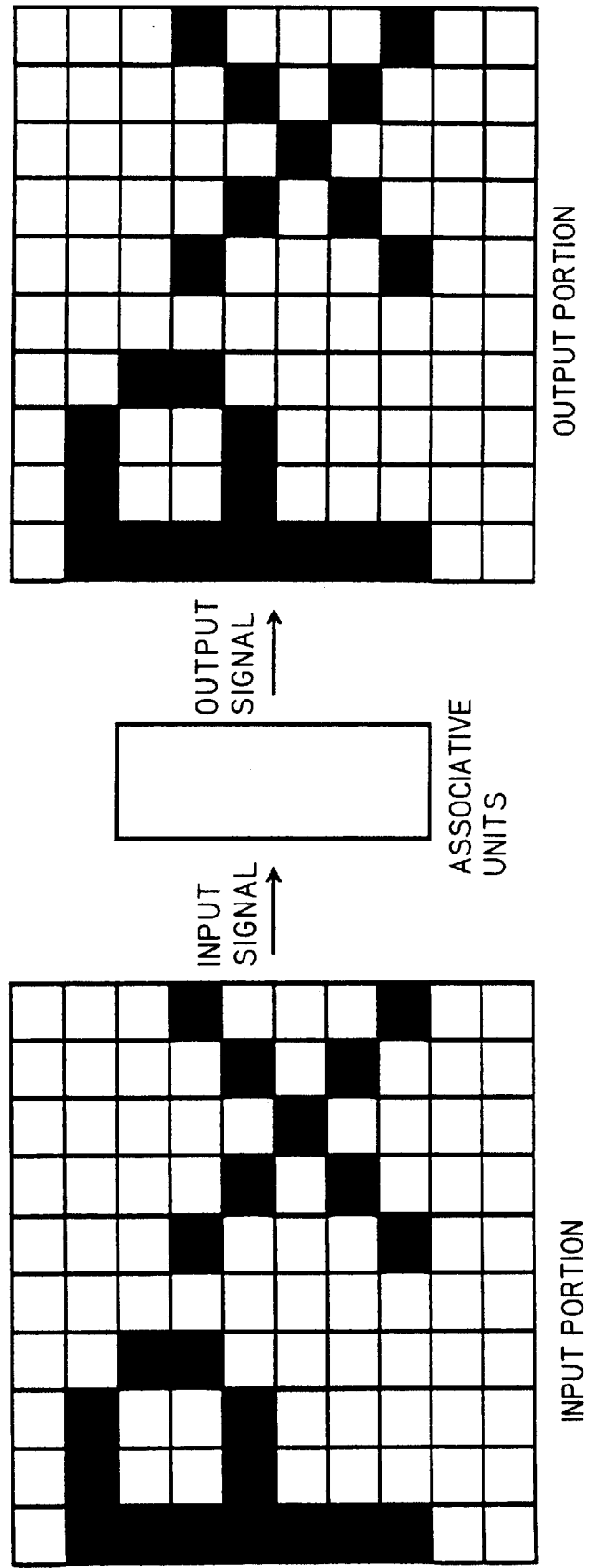
FIG. 25 illustrates characters that appear as output signals when characters "P" and "X" are simultaneously input as input signals.
Figure 26:
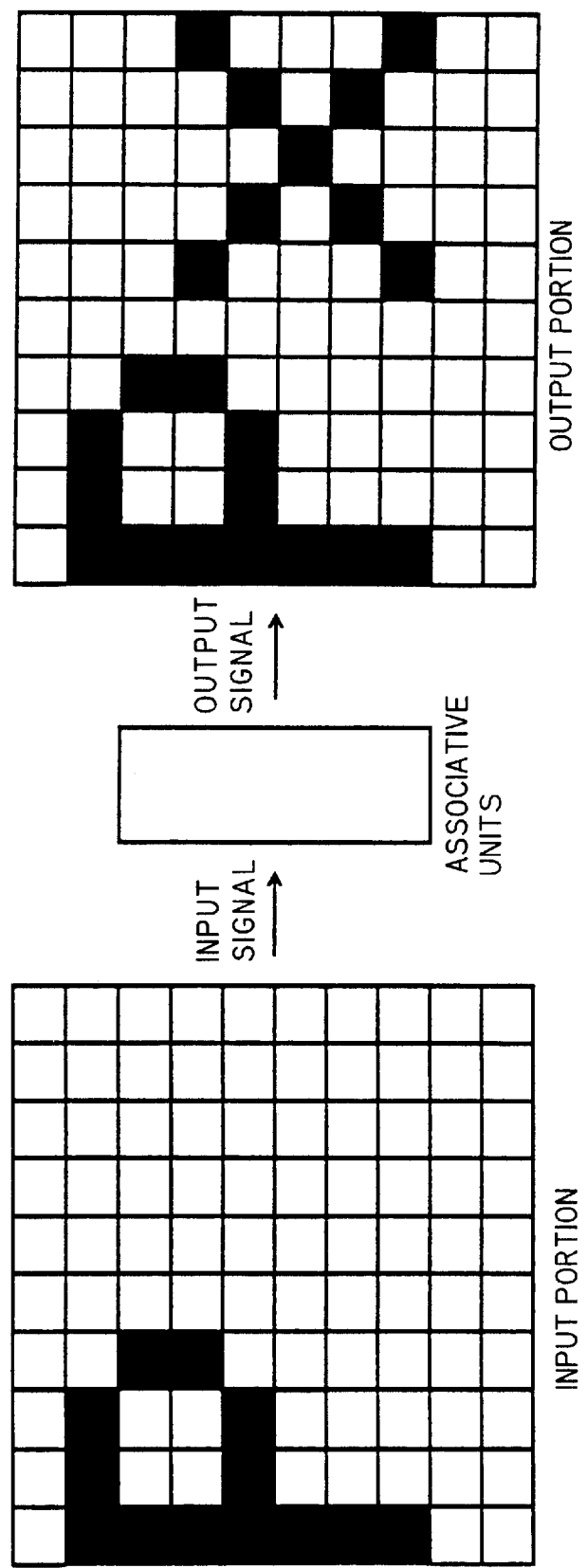
FIG. 26 illustrates characters that appear as output signals when the character "P" is input immediately after the characters "P" and "X" are input simultaneously.

When characters "P" and "X" are first simultaneously represented on the 10×10 pixel matrix as input signals, "P" and "X" are output (FIG. 25). Next, the characters "P" and "X", are output even if only the character "P" is input as an input signal immediately thereafter (FIG. 26).

Figure 27:
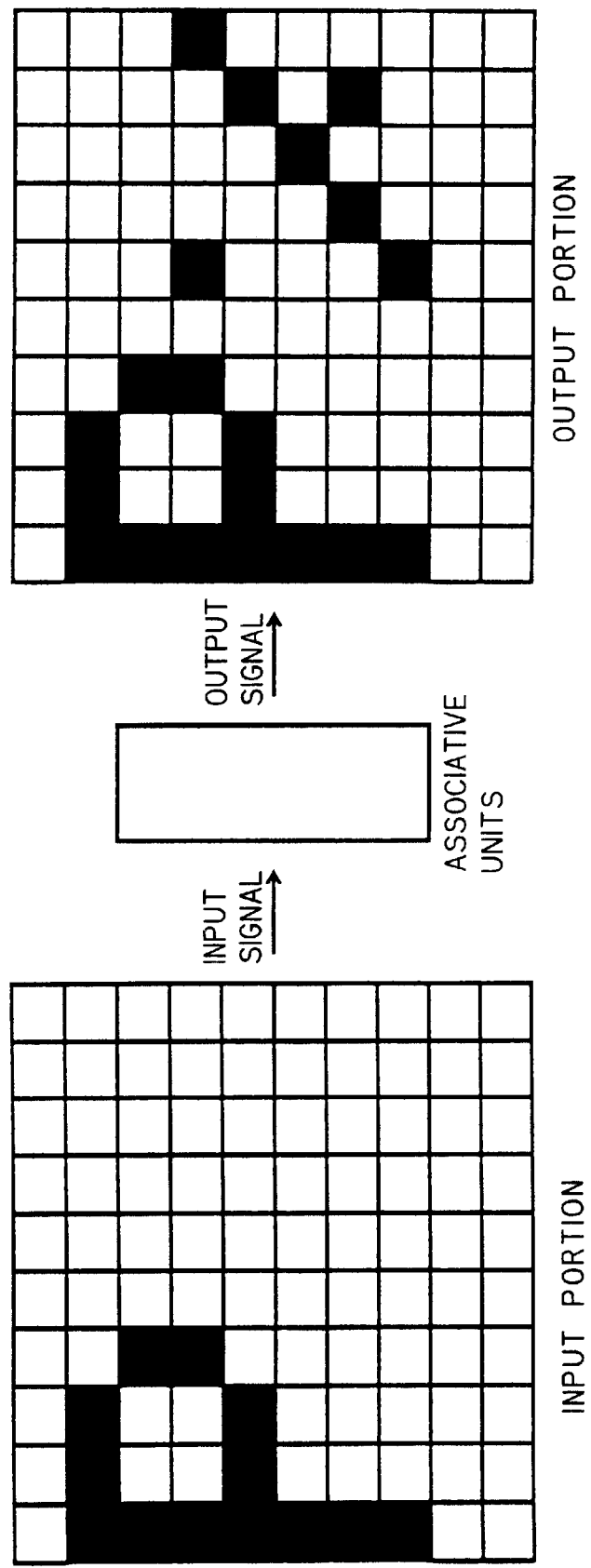
FIG. 27 illustrates characters that appear as output signals when the character "P" is input one hour after the characters "P" and "X" are input simultaneously.
Figure 28:
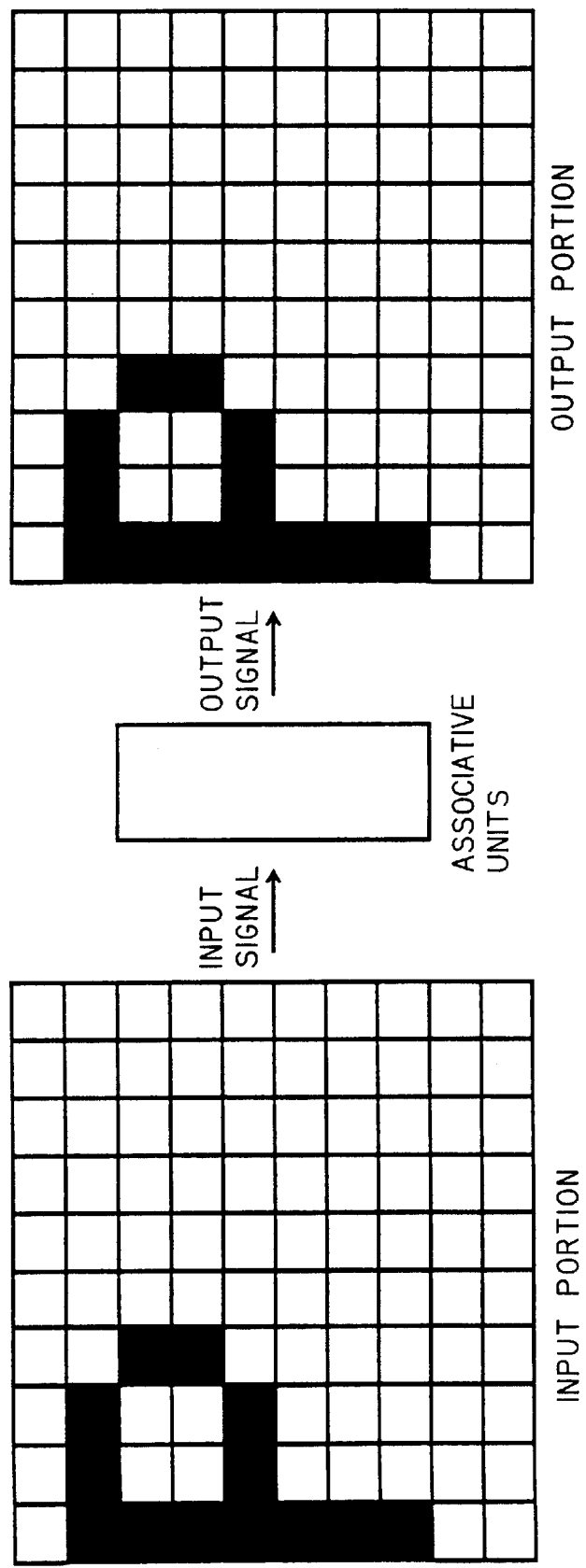
FIG. 28 illustrates characters that appear as output signals when the character a is input two hours (association retention time) after the characters "P" and "X" are input simultaneously.

When only the character "P" is input as an input signal one hour later, although the characters "P" and "X" are output, the character "X" which is output based on association instead of an input signal has some missing pixels because the association retention time has expired for some of the association units (FIG. 27). When the character "P" is input two hours later, only the character "P" is output because the association retention time has expired for all of the association units (FIG. 28).

Figure 29:
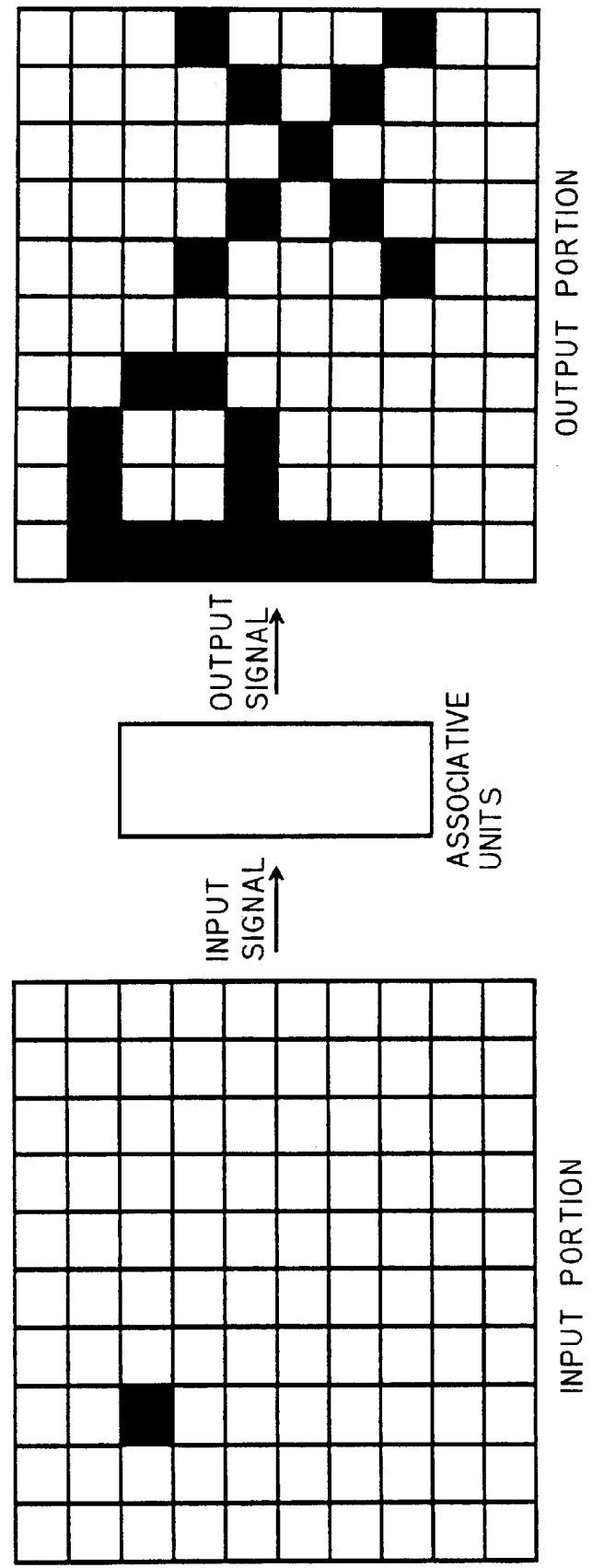
FIG. 29 illustrates the relationship between an input signal and an output signal of 2·2 units connected so as to extract all combinations in a 10×10 pixel matrix.

When association units are connected to obtain all combinations of extraction of two pixels from 100 pixels as described above, the characters "P" and "X" are output in response to the input of an input signal from only one pixel that forms a part of the character "P" as described in the above example (FIG. 29). This represents a function of allowing an original image as a whole to be recalled on an basis from only a part of the image.

Figure 30:
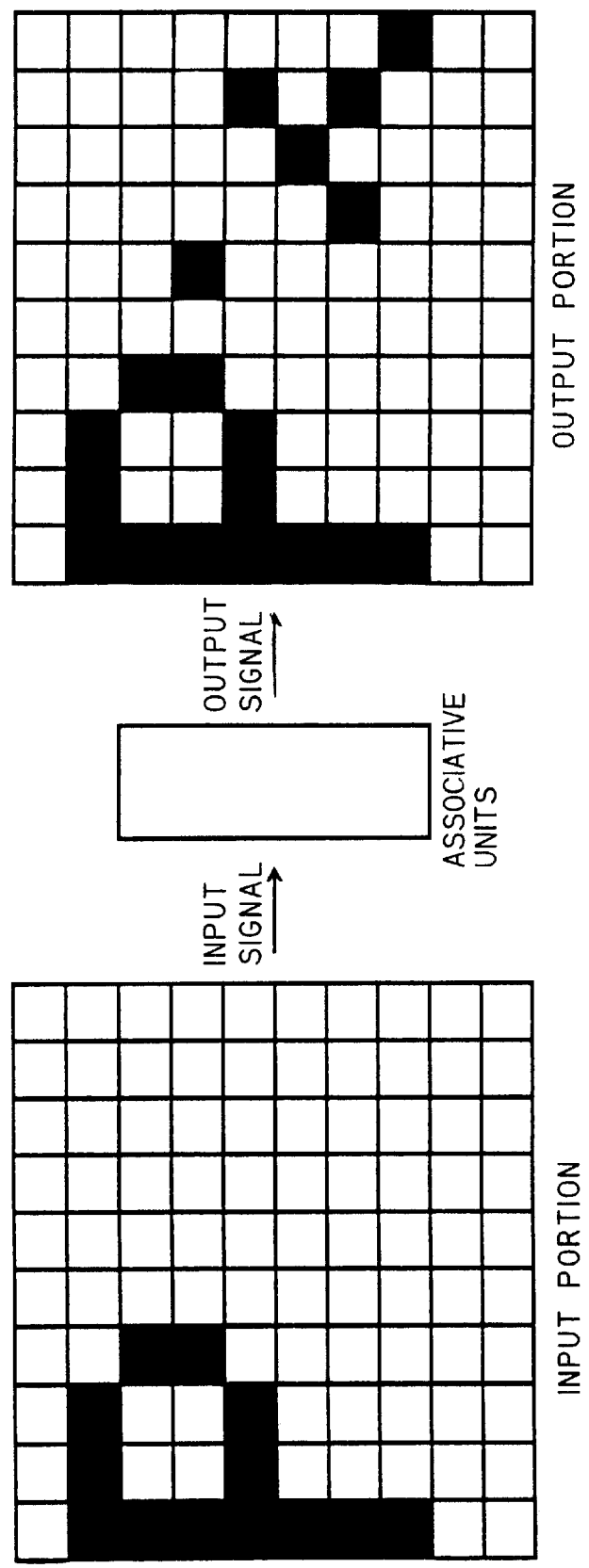
FIG. 30 illustrates the relationship between an input signal and an output signal of a reduced number of 2·2 units connected so as not to extract all combinations in a 10×10 pixel matrix.

If the number of the association units is reduced, e.g., if the number of the association units is reduced to 1,000 (one-fifth the number required to obtain all combinations), a complete character "P" and a character "X" including some missing parts are output this time when the character "P" is input as an input signal (FIG. 30).

Such a reduction of association units allows this image processing apparatus to have a property of blurring an image output on an basis which is encountered by a human being when recalling a memory.

The above example has indicated that a signal can be processed on an association basis. Although this example has shown the functions of four units on four pixels and 4,950 or 1,000 units on 100 pixels, it is obvious that image processing for a television or the like using 100,000 pixels and 100,000 such units will allow an image of a cat to be output from only an image of a dog after images of the dog and cat are output simultaneously.

Figure 31:
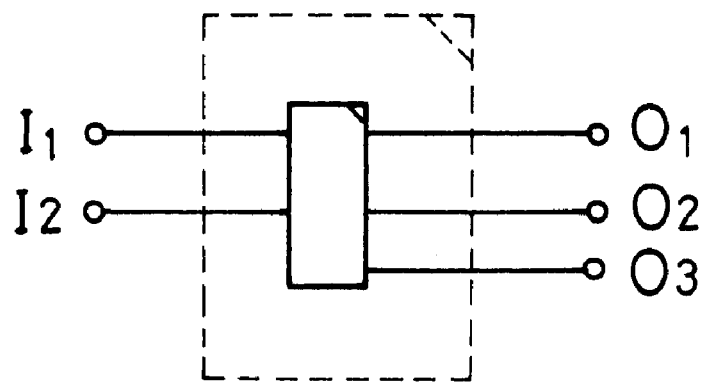
FIG. 31 is a schematic illustration of construction of a 2·2 unit using a 2·3 unit (k=2).

A modification of such an association unit will now be described with reference to FIGS. 31 and 32.

While there are various types of association units such as 2·2 units, it is possible to combining 2·3 units as basic units to create another type of unit. For example, a 2·2unit can be created by simply disconnecting an output terminal $O_3$ of a 2·3 unit from another association unit. To create a 3·4 unit (k=3), an association retention time $T_a$ of units $u_1$, $u_3$ and $U_5$ is set at the same value as an allowable delay time $\tau_1$ of a 3·4 unit ($T_a=\tau_1$). The allowable delay time of all of the units themselves is also set at $\tau_1$. The association retention time ($T_1$) of the 3·4 unit is set at the association retention time of units $u_2$, $u_4$ and $u_5$. The output terminals 1, 2 and 3 of the 2·3 units are not connected to other units.

Figure 32:
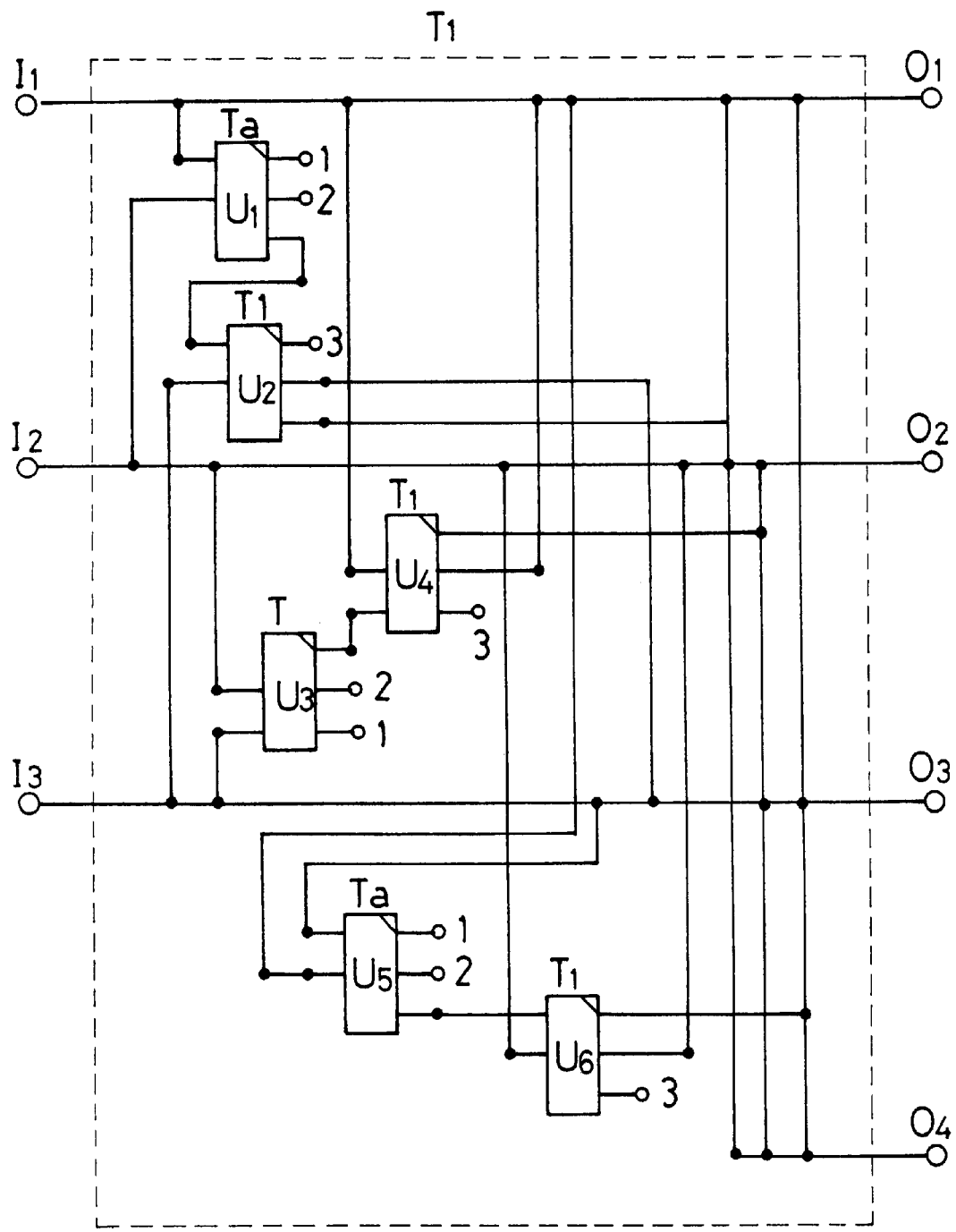
FIG. 32 is a schematic illustration of construction of a 3·4 (k=3) unit using a 2·3 unit (k=2).

Thus, a 3·4 unit can be created by combining six 2·3 units (FIG. 32). Various types of units can be created by designing the connection between 2·3 units appropriately.

A first embodiment of an unit will now be described with reference to FIG. 33.

Although an embodiment of an "association unit" according to the present invention will be shown, the present invention is not limited to the same embodiment. While an unit of the present embodiment is configured using existing electronic units, it may be configured using other units having the same function including chemical substances such as protein, nucleic acid, oxygen, amino-acid and sugar and physical units such as light and heat. Further, although a clock circuit of the present embodiment is based on an oscillation frequency of an oscillation circuit, time may be defined based on other methods such as the time spent for chemical reactions and the time required by light to travel predetermined distances.

The first embodiment (2·2 unit) will be described with reference to the circuit diagram shown in FIG. 33. Seven integrated circuits IC1 through IC7 were used. The IC1 through 6 are CMOS type integrated circuits for logic circuits having 14 or 16 pins. A logic circuit is indicated by a MIL symbol by convention. IC1 is a 4069UB type IC which is an inverter having six circuits. Only one circuit was used in the present embodiment.

IC2 and IC6 are 4081B type AND gate IC having four circuits. Only a part of those circuits are used in the present embodiment.

IC3 is a 4093B type four-circuit NAND gate IC.

IC4 is a 4020B type 14-stage asynchronous binary counter which allows a pulse signal having a rectangular waveform with a pulse with of 3 minutes to be obtained by taking out an output signal from a pin No. 15 in the present circuit configuration. This IC provides rectangular signals having pulse widths in the range from 0.35 seconds to 12 minutes by taking out output signals from pins other than the pin No. 15.

IC5 is a 4025B type 3-circuit NOR gate IC only a part of which was used here.

IC7 is an AN8004 type power supply voltage adjusting IC which provides an output voltage of +4.0 V. While +4.5 VDC was used as the power supply in the present embodiment, +5.0 V may be used instead.

Figure 33:
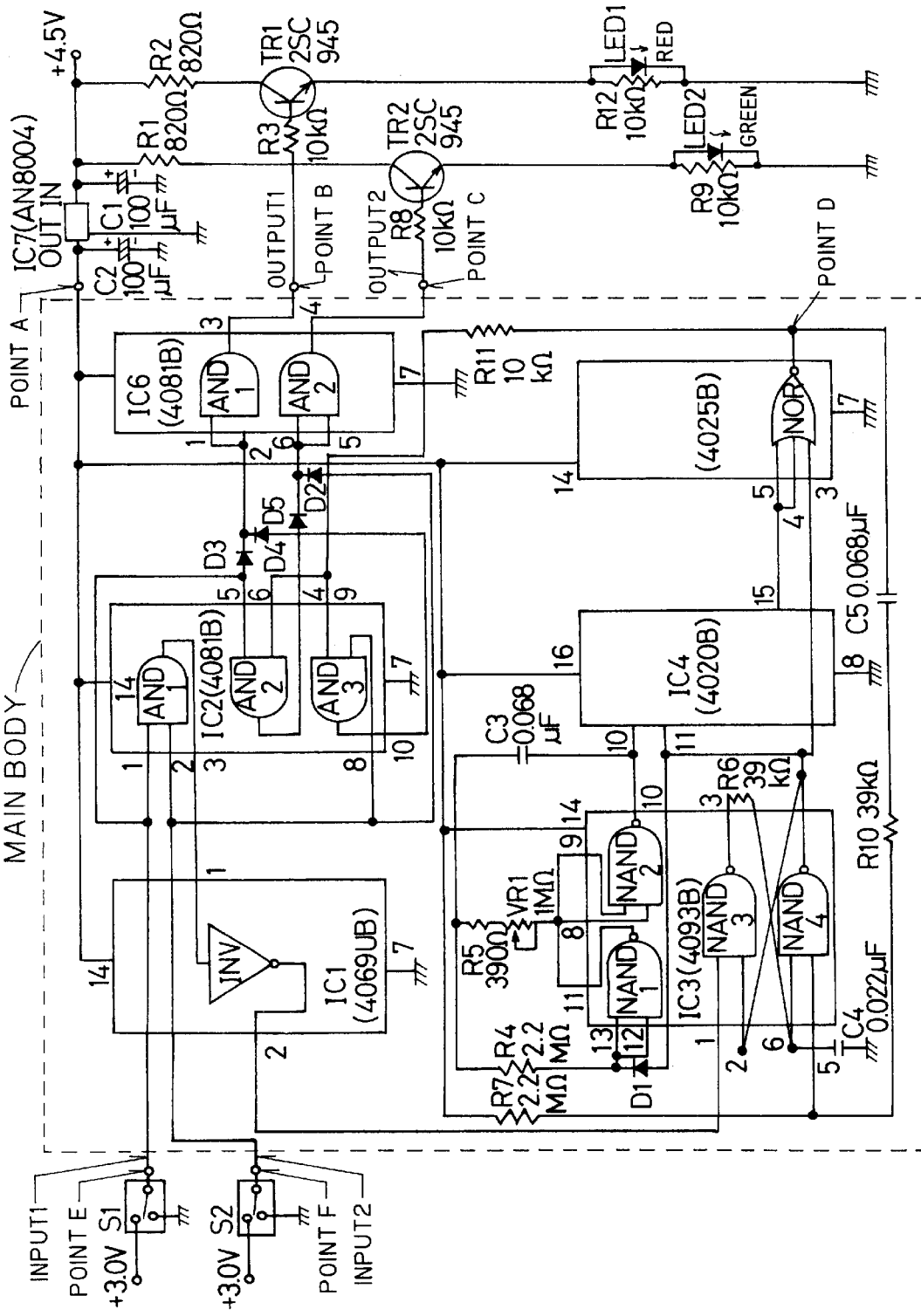
FIG. 33 is a circuit diagram of a 2·2 unit.

In FIG. 33, the main body of the unit is represented by the region enclosed in the broken line in the form of a square, and there are units used for power supply, input signals and output signals outside the square. An input signal was applied to an input terminal 1 (point E in FIG. 33) or an input terminal 2 (point F) as a "pulse signal" by supplying a DC power supply of +3.0 V through two-contact switches S1 and S2.

The output signal was an output 1 (point B) and an output 2 (point C) which were respectively input as base currents of transistors TR1 and TR2 through 10 kΩ resistors (R3 and R8) and which were verified from illumination of light-emitting diodes LED1 (red) and LED2 (green) caused by them.

A principle behind the operation of the 2·2unit shown in FIG. 33 will now be described. First, when there is no input signal, more precisely, when the input voltage is in the range from 0 to 0.4 V (which is generally referred to as "L level"), a pulse signal from an oscillation circuit formed by NAND1 and NAND2 of IC3, resistors VR1 and R5 and a capacitor C3 is input to a pin No. 10 of an input terminal of IC4. This signal is waiting for counting because a voltage at H level (in the range from 1.4 to 4.0 V) has already been applied to a pin No. 11 of a reset terminal.

When an input signal of +3.0 V (H level) is applied to the input terminal 1 from only the switch S1 in this state, this H level signal produces an output signal at H level (in the range from 2.5 to 3.7 V) at the point B as the output 1 through a diode D3 and an AND gate of IC6. This output signal was output through the transistor TR1 to the light-emitting diode LED1 to turn on the same. This allowed the output of the signal at the output 1 to be confirmed. When the switch S1 was connected to the ground (earth) position (which corresponds to turning off), LED 1 was turned off. Similarly, when only the switch S2 was turned on to apply the input signal at H level only to the input terminal 2, the green light-emitting diode LED 2 was turned on.

It was thus confirmed that input signals 1 and 2 produced output signals 1 and 2 independently and in real time.

Next, when the switches S1 and S2 are simultaneously turned on to apply the input signals 1 and 2 to the respective input terminals simultaneously, those H level signals are input to an AND gate (AND1) of IC2 from which a signal at H level is sent through a pin No. 3 to the inverter of IC1 and is in turn input to a NAND gate (NAND3) through a pin No. 1 of IC3 as an output signal at L level (in the range from 0 to 0.2 V).

NAND 3 and NAND 4 form an RS latch in which transition of an input signal at a pin No. 1 from H level to L level serves as a signal initiating transition of the output of a pin No. 4 from H level to L level and in which the L level output continues for some time as a result of the latching function. This L level output is input to a pin No. 11 of IC4 which is a reset signal input terminal of the binary counter IC4, and this counter continuously counts the number of pulses input from a terminal No. 10 while the input of the L level signal thereto continues.

A pulse output signal from a pin No. 15 changed to L level immediately after a reset and stayed at L level for 3 minutes. The time of 3 minutes, i.e., "association retention time" was set through fine tuning of the semifixed resistor VR1.

A NOR gate of IC5 receives the L level signals from IC3 and IC4 and outputs an output signal at H level from a pin No. 6 for 3 minutes. As a result, an H level signal is input to the gates of AND2 and AND3 of IC2. Therefore, even if only one of the inputs 1 and 2 is input, an output signal at H level is output at the outputs 1 and 2 from a pin No. 4 or No. 10 of IC2. In practice, in spite of the fact that only one of the input signals 1 and 2 was input through the switch S1 or S2, both of the light-emitting diodes LED1 and LED2 were turned on during the association retention time of 3 minutes, which proved the function of outputting a signal "associatively" of this association unit. That is, it was confirmed that when the association unit is not "activated", a signal is output only at the output 1 or 2 in response to the input 1 or 2 respectively and, once the unit is "activated" as a result of simultaneous input of the inputs 1 and 2, a signal is output from both of the outputs 1 and 2 in response to the input of either the input 1 or input 2 during the "association retention time" (3 minutes in this embodiment).

In the present embodiment, when the association retention time of 3 minutes expires, the output voltage of the pin No. 6 of IC5 changes from H level (in the range from 3.8 to 3.9 V) to L level (0.1 V). Then, as the capacitor C5 is charged, a voltage at a pin No. 5 of IC3 is temporarily reduced to L level (in the range from 0.2 to 0.4 V). As a result, the output voltage of the NAND 4 gate (pin No. 4) changes from L level to H level. Then, a voltage at H level is applied to the pin No. 11 of IC4 to stop the output of a count from this binary counter.

The association retention time can be changed within the range from 0.35 seconds to 12 minutes by leaving the pin No. 15 of IC4 unoccupied and using other pins instead as input terminals.

Alternatively, the association retention time may be extended by changing the capacity of the capacitor C3 from 0.068 $\mu$F to another value. This takes advantage of the fact that the period of the oscillation circuit in this region is proportionate to the capacity of the capacitor C3. When the capacity of the capacitor C3 was increased from 0.068 $\mu$F by a factor of 1,000 to 68 $\mu$F in the state as described above wherein the pin No. 15 of IC4 was used as an output terminal and the association retention time was set at 3 minutes, the association retention time was increased by a factor of 1,000 to 3,000 minutes (50 hours).

Further, a long association retention time such as 20 years can be set by connecting binary counters similar to IC4 in series, i.e., by inputting the output signal at the pin No. 15 of IC4 to a pin No. 10 of another newly provided 4020B type binary counter.

The current at a point A was measured at 0.82 mA. Since the voltage at the point A was 4.0 V, it was revealed that one unit of this 2·unit has poser consumption of 0.82 mA×4.0 V=3.28 mW. The current at the point A had variations in the range from 0.78 mA to 0.86 mA which range slightly varied depending on whether there was an input signal or not. Input resistance was measured at 70 M$\Omega$ at both of the inputs 1 and 2 when measured at points E and F in preparation for the connection of a multiplicity of 2·2 units. Insertion of load resistance of 70 M$\Omega$ at points B and C resulted in a voltage of 0 V (L level) when there was no output signal and in a voltage of 4.0 V (H level) when there was an output signal at each of the points, which proved that it is possible to connect a multiplicity of 2·2 units to use an output signal from a certain unit as an input signal to another unit.

Figure 34:
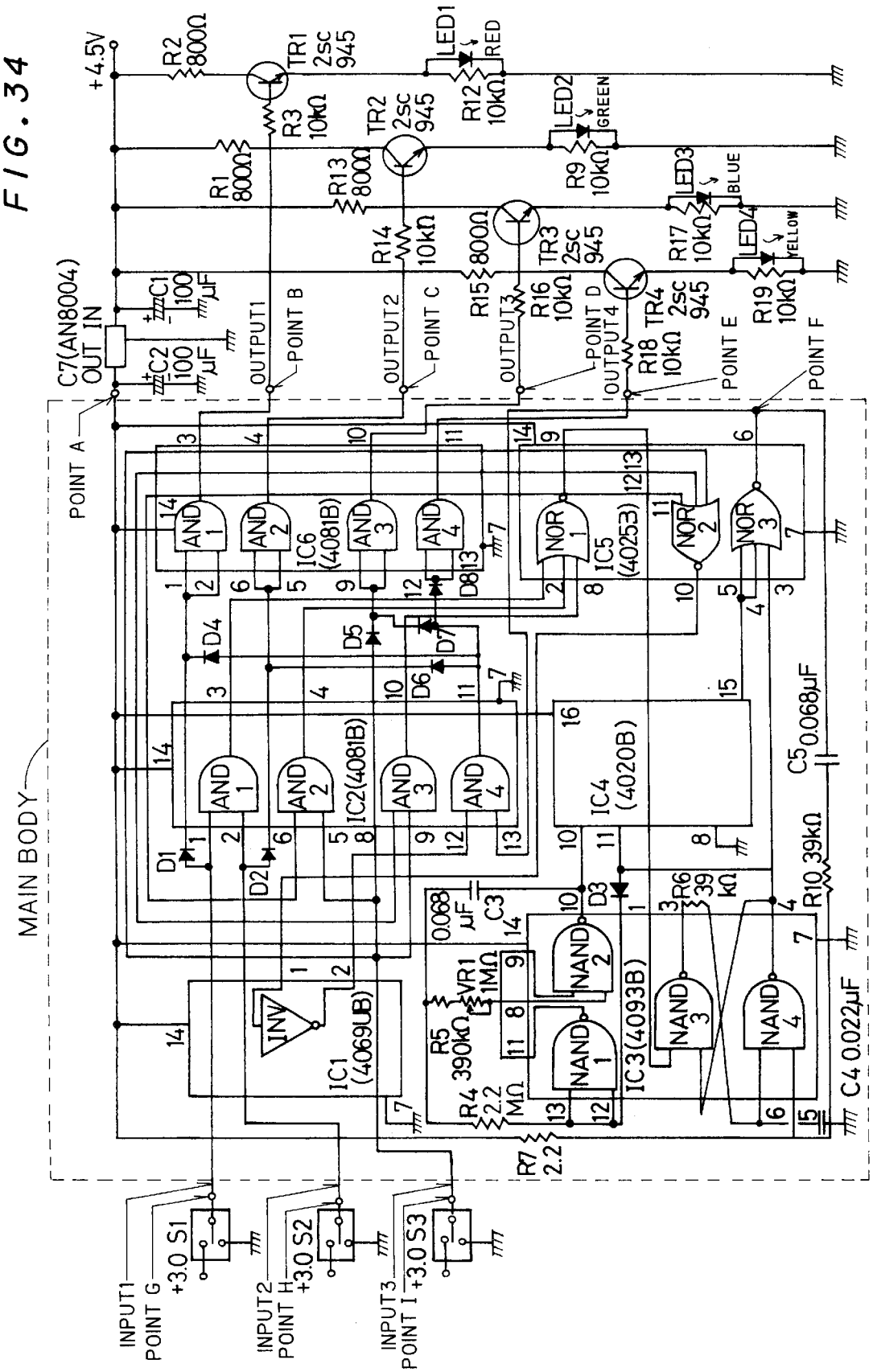
FIG. 34 is a circuit diagram of a 3.4 unit (k=2).

A second embodiment of an unit will now be described with reference to FIG. 34.

An embodiment of a 3·4 unit (k=2) shown in FIG. 34 will be described. In this embodiment, the unit is activated when two of input signals are simultaneously input at two of inputs 1, 2 and 3 and, thereafter, four output signals are simultaneously output at outputs 1, 2, 3 and 4 in response to an input signal to any one of the inputs 1, 2 and 3 during its association retention time.

First, when a pulse-like input signal of +3.0 V was input as the input 1 through a switch S1 in an idle state, a red light-emitting diode LED1 was turned on only for the duration of the input signal, which proved that there was the output 1. Similarly, when the input 2 was input through a switch S2, a green LED2 was turned on, which proved there was the output 2. Further, when the input 3 was input through a switch S3, a blue LED3 was turned on, which proved there was the output 3. A yellow LED 4 is not turned on because the output 4 is a "blind output terminal".

Next, after two of the input signals were simultaneously input by switches S1, S2 and S3 in an appropriate combination, all of the LEDs 1 through 4 were turned on in response to only one input from any of the switches S1, S2 and S3 for 3 minutes, which proved that this unit had been activated. Within the association retention time, all of the LEDs 1 through 4 were on for the duration of input signals regardless whether there is an input to two or all of inputs 1, 2 and 3.

Further, when the association retention time of 3 minutes expires, an idle state was restored in which only one of the LEDs 1 through 3 was turned on in association with each of the inputs 1 through 3.

Like the first embodiment, the association retention time could be changed by using pins other than a pin No. 15 of IC4 as output terminals or by changing the capacity of a capacitor C3.

As apparent from this embodiment of a 3·4 unit, it was revealed that, in the case of a 5·5 unit (k=3), the function according to the first aspect of the invention can be achieved by providing a "k-input AND gate" for all combinations of 3 input terminals from among the five input terminals.

The power consumption and input resistance of the 3·4 unit described in the present embodiment were measured at values similar to those of a 2·2 unit. It was further revealed that a multiplicity of units of this type connected to each other can perform signal processing.

A third embodiment of an association unit will now be described with reference to FIG. 35.

Figure 35:
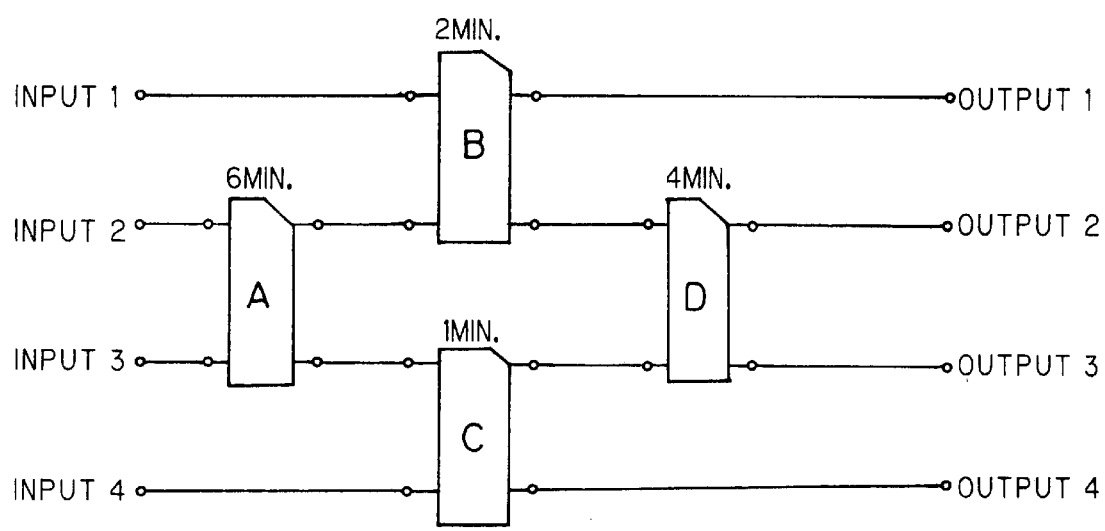
FIG. 35 is a diagram showing the connection of four 2·2 units.

As shown in FIG. 35, in order to prove that signal processing is possible with a multiplicity of 2·2units as shown in FIG. 33 connected to each other, four 2·2 units were connected and operational characteristics were examined thereon. The 2·2units used are the same as that shown in FIG. 33 and correspond to the region enclosed by the broken lines in the form of a square in FIG. 33, although they have different association retention time.

A DC power supply of +4.0 V was used. Rectangular waves of 0 V (no signal) and +4.0 V (signal) were applied to each of input terminals 1 through 4 as input signals. Output signals were checked by reading DC ammeters provided between output terminals 1 through 4 and the ground. The four units were connected as shown in FIG. 35, and the association retention time of each unit was as shown in FIG. 35.

The results of observation of the operational characteristics of the four unit connected were as follows. First, when a signal of +4.0 V was independently applied to the inputs 1 through 4 for 5 seconds, an output signal of +4.0 V was obtained from each of the outputs 1 through 4 for 5 seconds. This indicates that a signal is preferably transmitted through the units thus connected.

Next, input signals were simultaneously applied to all of the inputs 1 through 4 for 5 seconds. When an input signal was applied immediately thereafter only to the input terminal 2 for 5 seconds, an output signal was obtained at all of the outputs 1 through 4 for 5 seconds. This result indicates that "association" occurs in all of the four units. Meanwhile, when an input signal was applied only to the input 2, an output signal was obtained at the outputs 2 through 4. Further, when an input signal was applied only to the input 1, an output signal was obtained at the outputs 1 through 3. This indicates that the connection shown in FIG. 35 functions in compliance to the theory. In addition, when an input signal was applied only to the input 2 three minutes later, an output signal was obtained at the outputs 2 and 3. This indicates that the association retention time of each unit is working properly. The present embodiment proved that a multiplicity of units connected to each other function properly.

A fourth embodiment of an unit will now be described with reference to FIGS. 36 through 45.

An experiment as follows was carried out by to prove that an "process" can be performed on an image signal using a multiplicity of units (2·2 units).

Figure 36:
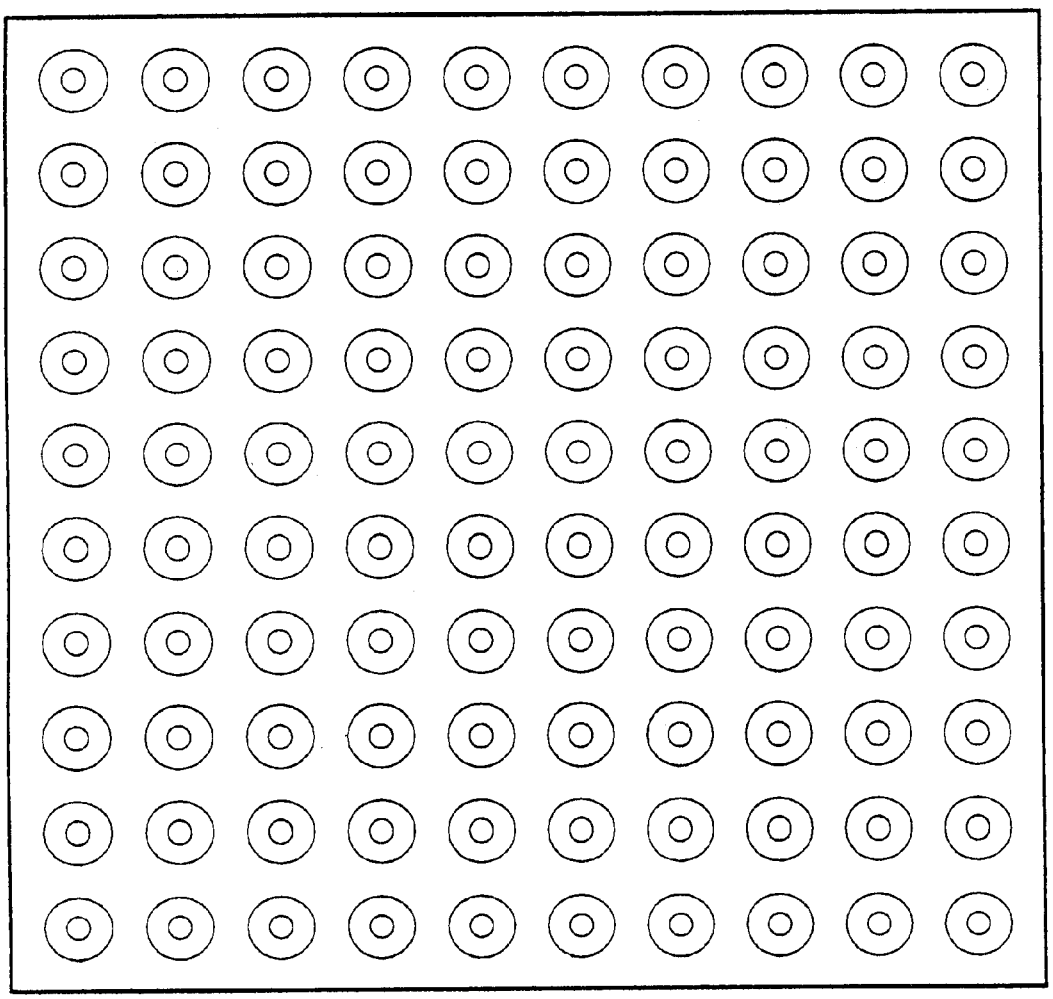
FIG. 36 is a schematic view of a front side (light emitting side) of a signal generator showing the arrangement of 100 light sources constituted by semiconductor lasers, wherein the 100 point light sources are equally spaced within a square of 14 cm×14 cm and each point light source emits a red laser beam from an open end thereof having a diameter of 2.2 mm.

First, there was provided a signal generator that produces an "image"consisting of 10 each point light sources in the vertical and horizontal directions totaling at 100 used as an image signal (FIG. 36).

As the point light source that forms each "pixel", a red semiconductor laser having a wavelength of 690 nm (whose operating voltage was 3 VDC and power consumption was 2 mW) was used. Further, a light-receiving surface (to be described later) constituted by an optical sensor was placed at a distance of 76 cm to detect the laser beam.

The beam of the semiconductor laser has a diameter of 2.5 mm at the distance of 76 cm. 100 units of such semiconductor laser were provided as shown in FIG. 36 and were provided with independent switches such that various images could be formed by the point light sources.

The direction of the beam emitted by each laser light source was subjected to fine adjustment such that it would impinge upon each of optical sensors (provided on the light-receiving surface and to be described later) in one-to-one correspondence thereto and in the same position.

Figure 37:
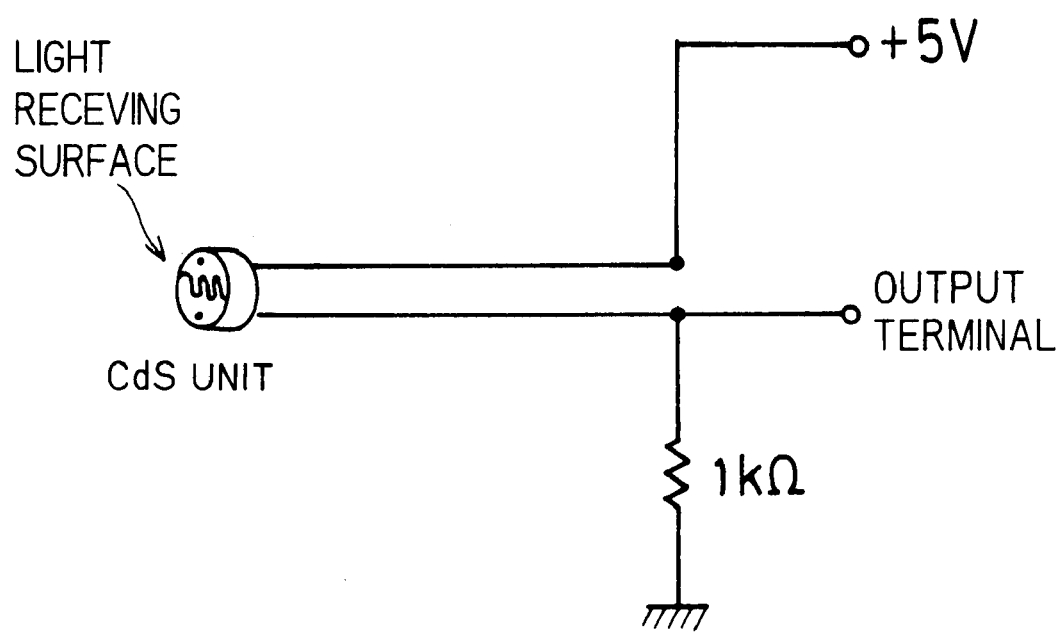
FIG. 37 is a circuit diagram of a single cadmium arsenide optical sensor, 100 units of this sensor being used in the form of a 10 (vertical)×10 (horizontal) array to configure a light receiving surface.

As the light-receiving surface, 100 cadmium arsenide sensors (CdS units) having a diameter of 5.1 mm were used and arranged at equal intervals within a square which is 14 cm long along one side thereof similar to that shown in FIG. 36. As described above, each of the semiconductor laser was adapted to irradiate each of the optical sensors in a one-to-one relationship. The position relationship between the laser light sources on the surface of the signal generator was the same as the position relationship between the optical sensors on the light-receiving surface. As shown in FIG. 37, a DC power supply of +5 V was used as each optical sensor, and a voltage across a resistor of 1 kΩ was used as an output voltage which served as an input signal input to a 2·2unit forming a part of a set of unit to be described later. The cadmium arsenide sensors used here exhibited the following characteristics in the circuit shown in FIG. 37.

With the voltage of +5 V applied, a CdS unit had resistance of 70 MΩ when it was in darkness (at illuminance of 0 lux), and the voltage across the resistor of 1 kΩ in FIG. 37 was 0.07 mV. When illuminated by a fluorescent lamp at illuminance of 200 lux, the resistance of the CdS unit was 14.5 kΩ, and the voltage across the resistor of 1 kΩ in FIG. 37 was 0.34 V. The current flowing through the resistor was 0.32 mA.

Further, when one semiconductor laser as described above was used to illuminate the cadmium arsenide optical sensor at the distance of 76 cm, the resistance of the CdS shown in FIG. 37 was 340 Ω, and the voltage across the resistor of 1 kg in FIG. 37 was 3.7 V. The current flowing through the resistor was 3.7 mA.

The output terminal of each optical sensor was connected to the input terminals of the set of units.

Figure 38:
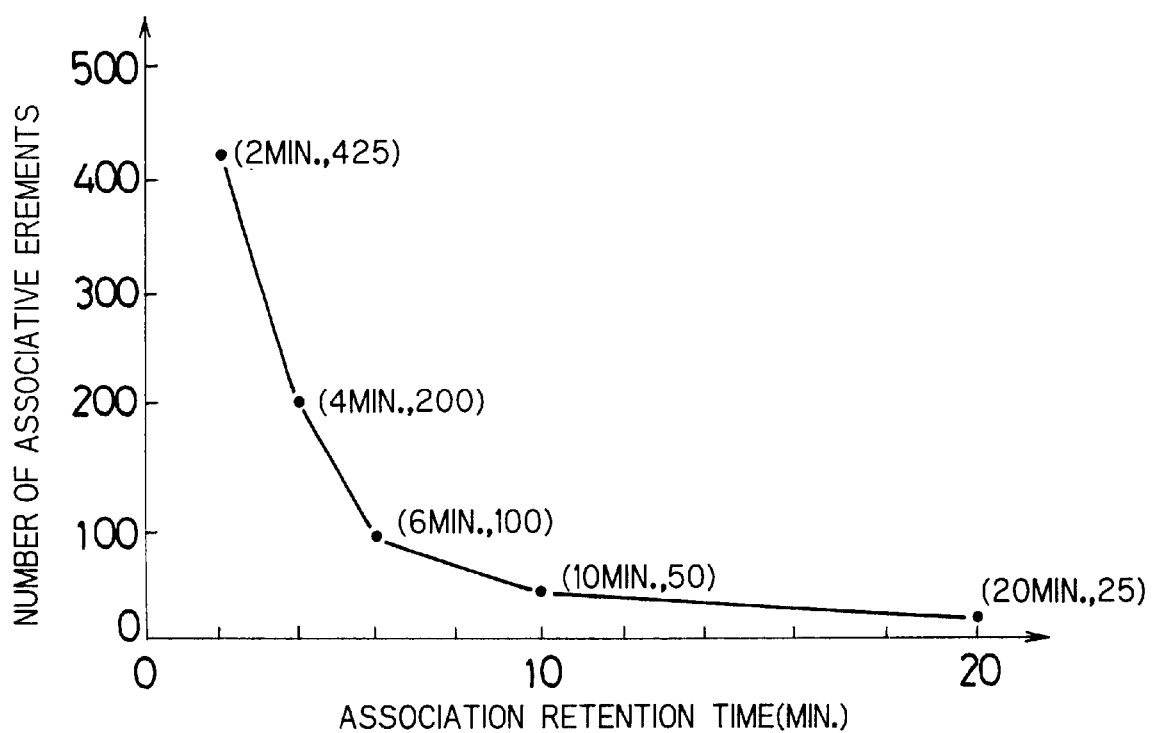
FIG. 38 illustrates the relationship between an association retention time and the quantity of eight hundred 2·2 units.

The set of units was configured using 800 2·2 units. The association retention time of each association unit used was assigned as shown in FIG. 38. As shown in FIG. 38, more units having short association retention time and less units having long association retention time were used to mimic a feature of a human brain of keeping more recent events in the form of association while losing the contents of association as if on an exponential functional basis as time passes.

In the present embodiment, the association units were not connected to each other, and all of the output terminals of the association units were connected to a display device as they were.

The output terminals of the optical sensors were connected to the input terminals of the units completely randomly using a table of random numbers. Specifically, the output terminal of a randomly selected optical sensor is connected to the input terminal of one 2·2 unit. In this regard, since the number of possible combinations for extraction of two output terminals from among those of the 100 optical sensors (there are 100 output terminals) is $_{100}C_2=100!/2! (100-2)!=4,950$, not all possible combinations of two output terminals are not extracted using the 800 unit, although this creates no problem. Obviously, in most cases, the input terminals of a plurality of 2·2 units are connected to one output terminal of any single optical sensor (the total number of the optical sensor output terminals is 100, and the total number of the input terminals of the association units is 800×2=1,600).

In the present embodiment, only 800 main bodies of the 2·2 units shown in FIG. 33 (region enclosed by the broken line). As the power supply, a 5 VDC power supply device having output of 20 W including a constant voltage circuit was used.

Figure 39:
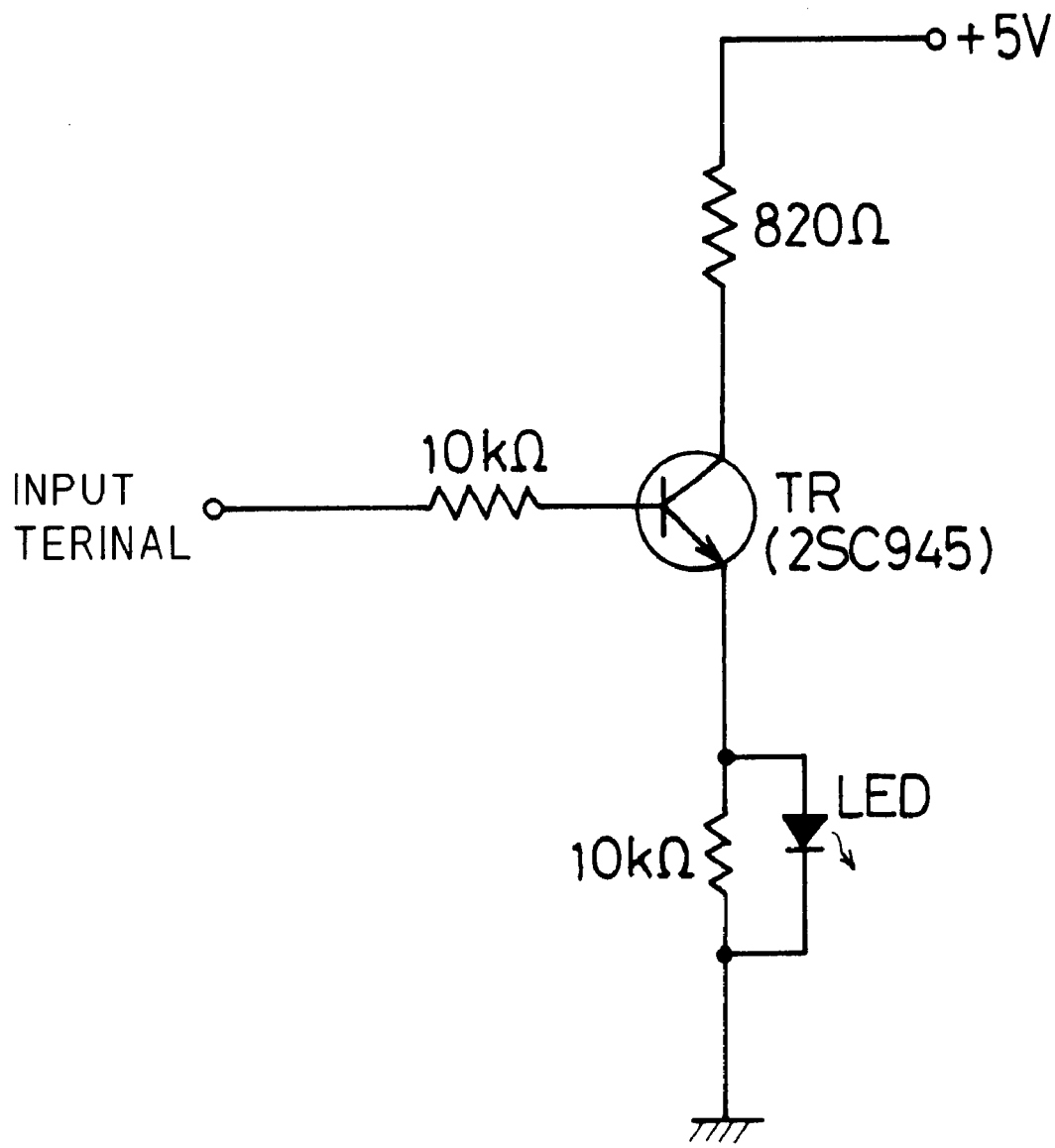
FIG. 39 is a circuit diagram of a part of a display device.

A description will now be made on the display device which was formed by preparing 100 units of the circuit shown in FIG. 39 and arranging them at equal intervals in a square which was 14 cm long along one side thereof. The circuit is comprised of one transistor (TR), a green light-emitting diode (LED) and three resistors, and the output terminal (1,600 in total) of the 2·2unit as described above is connected to the input terminal (100 in total). In the display device shown in FIG. 39, the LED emits green light when there is an input voltage equal to or higher than 2.4 V.

Further, in the present embodiment, the output voltage of the 2·2 unit is 3.0 V or more (when there is a signal) and the LED therefore always emits light when there is a signal.

Figure 40:
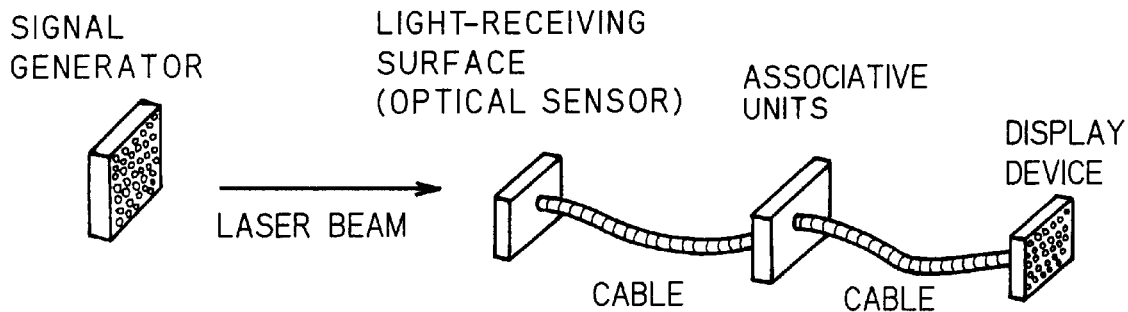
FIG. 40 is a diagram showing a configuration of the display device.

As the power supply for the display device, a 5 VDC power supply device having output of 20 W including a constant voltage circuit was used. The overall configuration of the present embodiment is as shown in FIG. 40.

Figure 41:
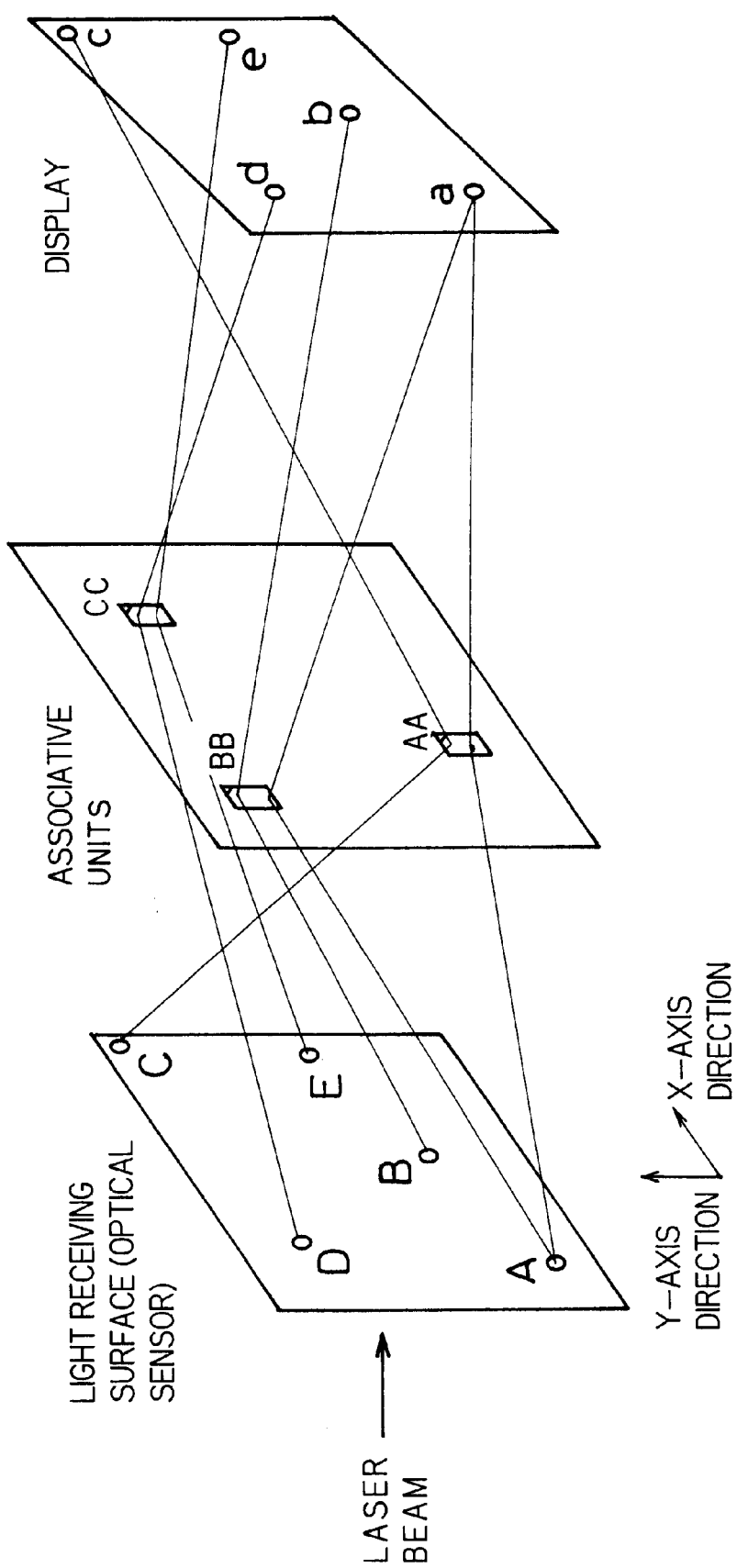
FIG. 41 is a schematic illustration of the relationship between the connections of an optical sensor, units and units forming a display device, wherein there is complete position correspondence between the optical sensor and the display device.

A method for the connection between each unit will be described with reference to FIG. 41. For example, an optical sensor A is in a position which is the third place in the X direction and second place in the X direction in the arrangement of 10 each sensors in the vertical and horizontal directions totaling at 100 (this arrangement is the same as the arrangement of the signal generator shown in FIG. 36), and such a position is represented by (3, 2).

An output signal from the sensor A in the position (3, 2) is input to an unit AA an output signal from which is connected such that it is input to an unit "a" in the same position (3, 2) as on the display device. What is important here is to make connection such that the position of a CdS unit on the light receiving surface (optical sensor) is in complete coincidence with the position of an LED unit on the display device. In the example of the sensor A and the unit "a", they are both in the position (3, 2).

While there are 800 association units in total, the position of these units is of no importance. For example, a sensor C in a position (10, 10) is connected to an unit c in a position (10, 10) through an association association unit BB. A sensor B in a position (6, 4) is connected to an unit b in the position (6, 4) through the association unit BB. This equally applies to sensors D and E.

While each of the sensors has a single output terminal as described above (FIG. 37), a signal is sent to a plurality of association units from the single output terminal in many cases. This is indicated in the example shown in FIG. 41 by the fact that a signal from the sensor A in the position (3, 2) is connected to the unit "all in the position (3, 2) not only through the association unit AA but also through the unit BB.

The connection between the light-receiving surface and association units and between the units and display device was made using a cable having a length of 1.2 m formed by 1,600 (800 units ×2 terminals) enamel-coated copper wires each having a diameter of 0.21 mm.

It was observed in the configuration described above whether illumination at each point on the signal generator would result in illumination of the LED on the display device in the same position. As a result, illumination of a semiconductor laser at a position (1, 1) certainly resulted in illumination of an LED in the position (1, 1).

Similarly, illumination of a semiconductor laser at a position (2, 1) certainly resulted in illumination of an LED in the position (2, 1). This operation was repeated sequentially and, as a result, as all of the 100 lasers emitted light independently, the respective LEDs in the same positions emitted light independently in real time.

Figures 42A, 42B:
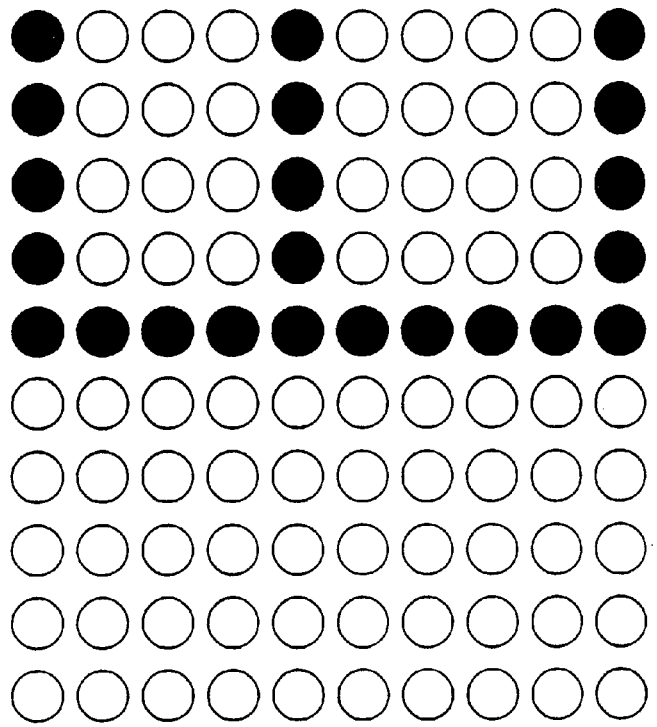
FIGS. 42A and 42B are illustrations of emission of light (black dots) representing character signals that occur on a display device in real time with respect to character signals at a signal generator, which show characters "H" and "E", respectively.

Next, a plurality of semiconductor lasers of the signal generator were turned on simultaneously to write a character "H" (FIG. 42A). As a result, the character "H" appeared in the corresponding position on the display device in real time. When the character "H" on the signal generator was turned off, the character "H" on the display device was also turned off. Similarly, when a character "E" was written on the signal generator (FIG. 42B), the character "E" appeared in the corresponding position on the display device and disappeared as the character "E" on the signal generator was turned off.

Figure 43B:
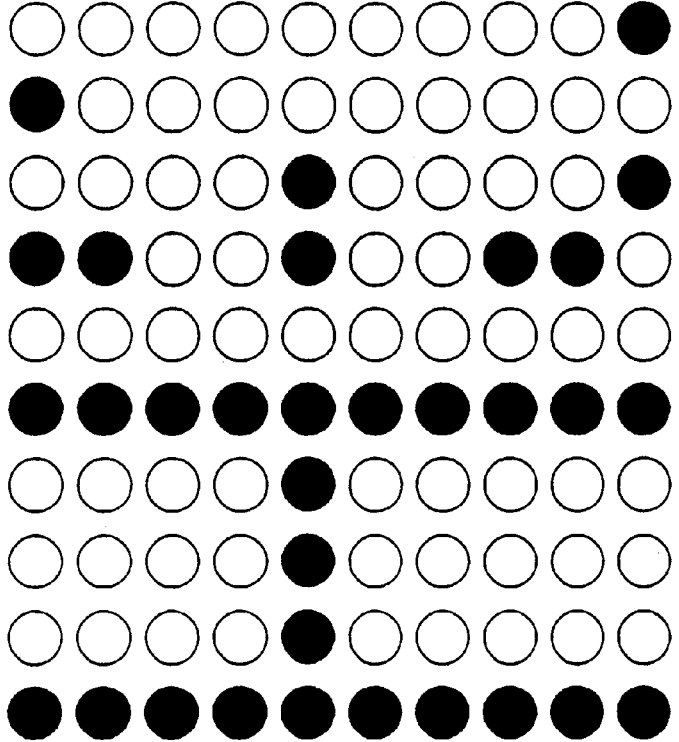
FIGS. 43A and 43B are illustrations of emission of light by the display device representing only the character signal H which is supplied 10 seconds (FIG. 43A) and 3 minutes (FIG. 43B) after the character signals H and E supplied by the signal generator are temporarily turned off.
Figure 43A:
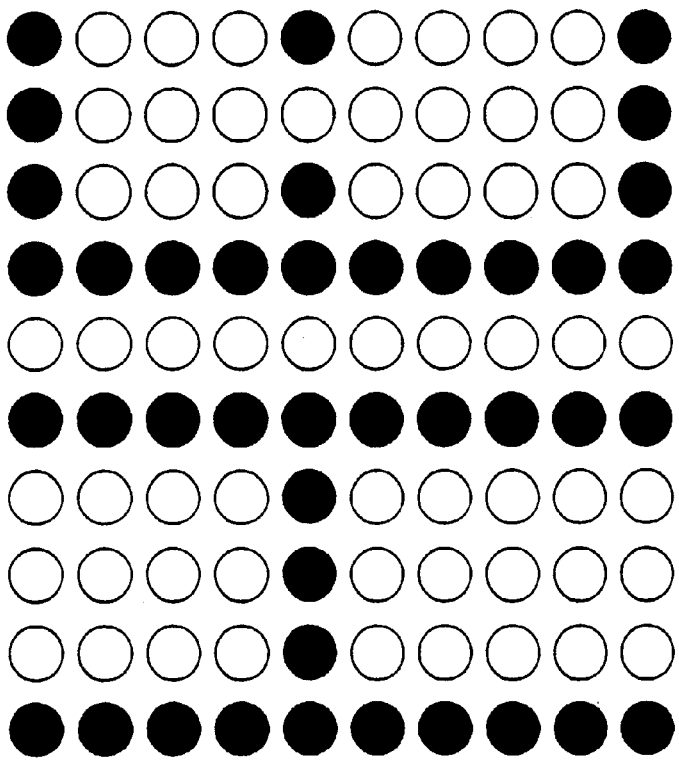

When the characters "H" and "E" were output from the signal generator simultaneously, the characters "H" and "E" appeared. Then, only the character "H" was output by the signal generator immediately thereafter (within 1 to 15 seconds thereafter and, as a result, not only the character "H" but also the character "E" appeared on the display device (FIG. 43A). This indicates that once the characters "H" and "E" are shown simultaneously, the character "E" appears "associatively" if only the character "H" is shown thereafter.

As shown in FIG. 43A, the character "E" has a missing part. This can be avoided if the association units (2·2 units here) are used in a quantity sufficient to extract all combinations (4,950 combinations) of the 100 optical sensors. Some parts of the character "E" are missing in this embodiment because the number of association units used is only 800. This made it possible to provided the apparatus with a property as that of a human being wherein an image of a person formed in one's imagination on an basis is blurred.

The laser beams from the signal generator were temporarily turned off immediately after the experiment as shown in FIG. 43A, and the character "H" was output again from the signal generator 3 minutes later. Then, not only the character "H" but also the character "E" appeared on the display device (FIG. 43B).

In this case, however, the number of missing parts in the character "E" was increased compared to the previous case. The increase in the number of missing parts of the character "E" is attributable to the fact that each of the association units forming a part of the set of units consisting of 800 2·2 units has a specific association retention time as shown in FIG. 38 and the function of those units is lost as time passes.

Although not shown, as a result of a similar experiment carried out 15 minutes later, the missing part in the character "E" were further increased and only two of the LEDs forming the character "E" emitted light. As a result of an experiment carried out after another 30 minutes, any part of the character "E" appeared.

Next, all laser beams from the signal generator were temporarily turned off; the characters "H", and "E" were output one hour later; and the signals were turned off thereafter.

Figure 44B:
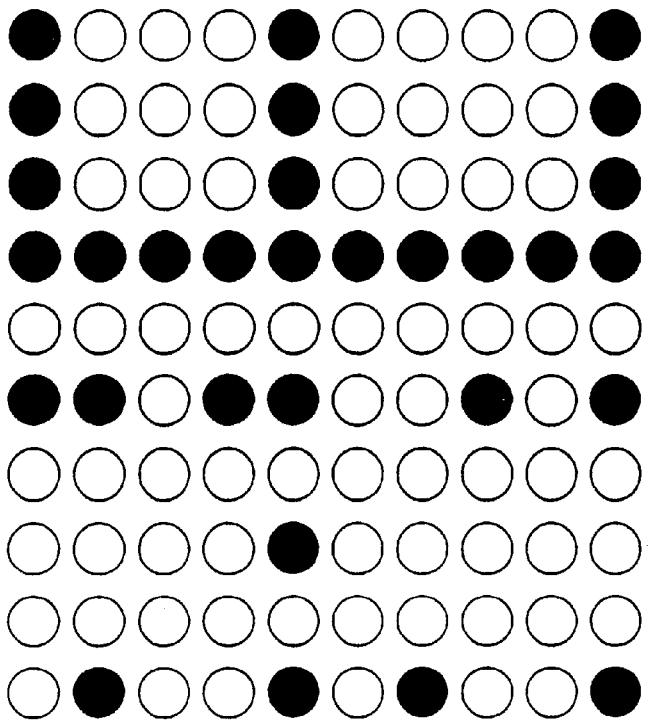
FIGS. 44A and 44B are illustrations of emission of light by the display device representing only the character signal E which is supplied 10 seconds (FIG. 44A) and 3 minutes (FIG. 44B) after the character signals H and E supplied by the signal generator are temporarily turned off.
Figure 44A:
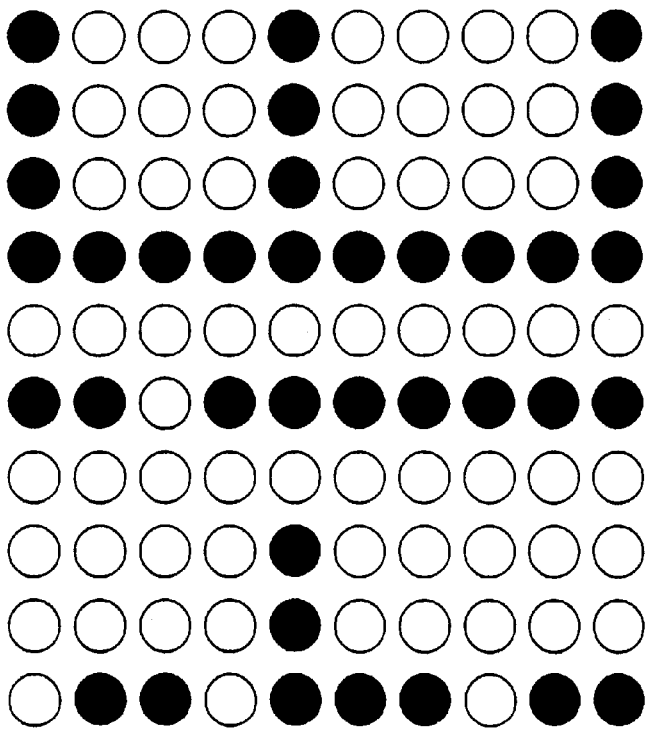

Immediately thereafter (within 1 to 15 seconds), only the character E was output instead of the character "H" in an intention to conduct an experiment which is the reverse of the previous experiment. Then, not only the character "E" but also the character "H" appeared on the display device (FIG. 44A). The signal generator was immediately turned off and was caused to output only the character "E" 3 minutes later. Then, the character "H" including many missing parts appeared again on the display device (FIG. 44B).

Figure 45B:
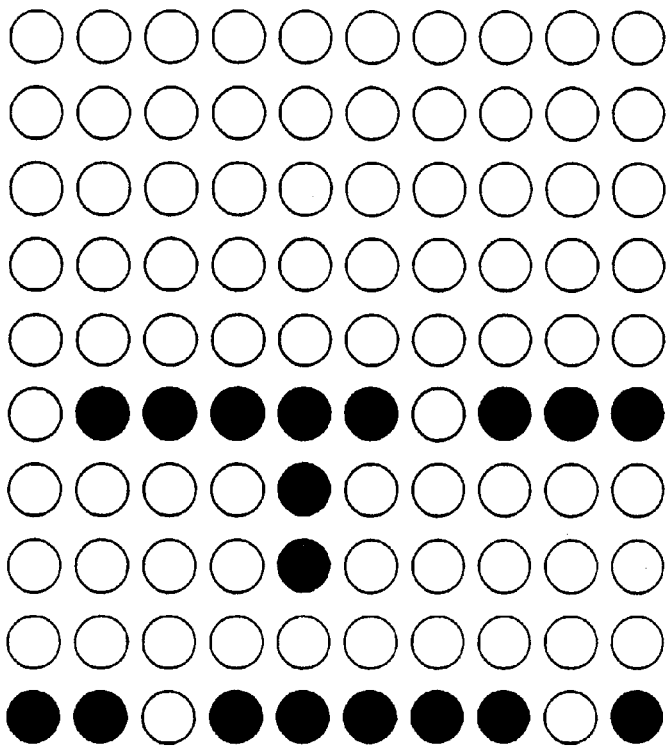
FIGS. 45A shows a vertical line which is a left-hand part of the character H and FIG. 45B shows emission of light from the display device that appears when a character signal for such a part is supplied 10 seconds after the character signal H supplied by the signal generator is temporarily turned off.
Figure 45A:
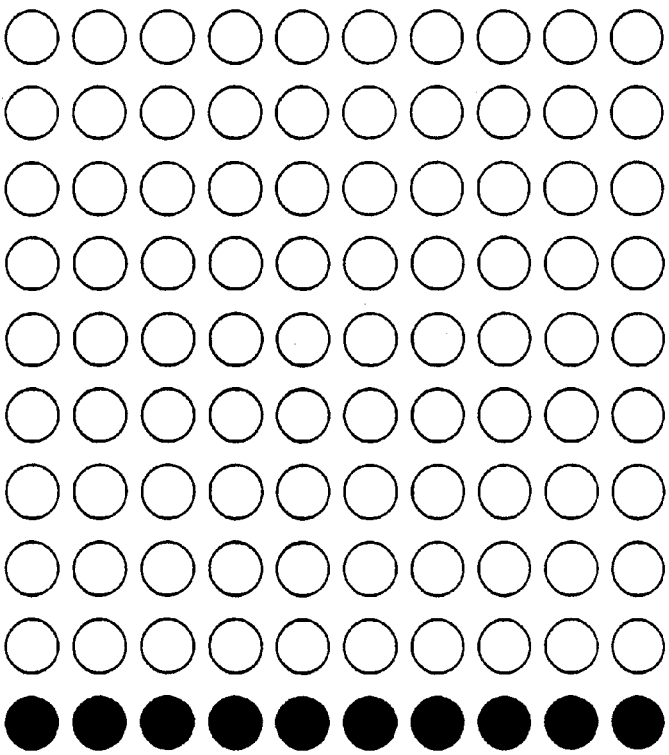

When the character "H" was newly output from the signal generator after the association retention times of all 2·2 units expired, the character "H" appeared in the corresponding position on the display device. Immediately thereafter (within 1 to 15 seconds thereafter), only the part of the vertical line on the left side of the character "H" was output from the signal generator (FIG. 45A) and, as a result, the character "H" appeared on the display device (FIG. 45B).

This indicates that once the character "H" is shown, the character "H" appears "associatively" thereafter when only a part of the character "H" is shown. In other words, it indicates that an image appears on an basis when only a part of the image is shown. In this case, the character "H" included missing parts because only 800 units (2·2units) were used. Obviously, the character "H" will clearly appear without any missing part if the number of units is increased to 4,950.

The above-described embodiments indicate that the association unit according to the present invention makes it possible to process complicated information on an basis. While the image information described in the last embodiment may be an image formed by a plurality of lamps or the like, i.e., a set of point light sources, a light-emitting device such as a lamp has low beam converging properties compared to laser beams. In such a case, an inverted real image may be formed through a convex lens and a result as in the above-described embodiments can be obtained by placing an optical sensor in the position of the real image. Further, it is obvious that the signal processing can be carried out on a more complicated image by increasing the number of point light sources corresponding to pixels and the number of association units.

The present invention makes it possible to provide an unit which records a piece of information in association with another piece of information and reproduces the recorded pieces of information through association between the pieces of information associated with each other, i.e., an unit capable of "reproducing associatively" and to provide apparatuses including an information processing computer which operates in a way very similar to the information processing that occurs in animals including human beings utilizing a circuit which is a combination of such units. Such apparatuses are significantly different from the existing electronic computers in that they have properties that can be regarded characteristic of animals such as "illusion", "association", forgetting" and "inspiration".

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An association unit comprising:
a plurality of signal input terminals;
a plurality of signal output terminals;
an activation processor which activates the association unit when a predefined threshold number of signal input terminals have received simultaneous input signals;
a first repeating unit for, when the association unit is not activated, receiving an input signal from a first input terminal and for outputting an output signal from a first output terminal corresponding to the first input terminal, wherein the output signal is substantially identical to the input signal; and
a second repeating unit for, when the association unit is activated, receiving an input signal at the first input terminal and for outputting an output signal from all of the output terminals, wherein the output signal from all of the output terminals is substantially identical to the input signal.

2. An association unit comprising:
a plurality of signal input terminals;
a plurality of signal output terminals;
an activation processor which activates the association unit when a predefined analog signal threshold is received;
a first repeating unit for, when the association unit is not activated, receiving an input signal from a first input terminal and for outputting an output signal from a first output terminal corresponding to the first input terminal, wherein the output signal is substantially identical to the input signal; and
a second repeating unit for, when the association unit is activated, receiving an input signal at a first input terminal and for outputting an output signal from all of the output terminals, wherein the output signal from all of the output terminals is substantially identical to the input signal.

3. A method for association in a repeating apparatus for repeating input and output signals comprising:
receiving, during an inactive state of the repeating apparatus, simultaneous input signals at fewer than a threshold number of input terminals and outputting output signals having the same contents as the input signals only from output terminals associated in advance to each of the input terminals that received an input signal when the input signals, which are pulse-shaped rectangular wave signals, are input to the input terminals;
receiving, during an inactive state of the repeating apparatus, simultaneous input signals at greater than the threshold number of input terminals, switching the repeating apparatus to a temporary active state, and outputting an output signal from all of the output terminals; and
receiving, during an active state of the repeating apparatus, one or more input signals and outputting an output signal from all of the output terminals.

4. A method for association in a repeating apparatus for repeating input and output signals, the repeating apparatus having signal input terminals and output terminals, the method comprising:
receiving, during an inactive state of the repeating apparatus, a plurality of simultaneous analog input signals in at least one input terminal the analog input signals having a total signal strength less than a threshold value and outputting a plurality of output signals being substantially identical to the plurality of input signals only from particular output terminals associated with the at least one input terminal;
receiving, during an inactive state of the repeating apparatus, a plurality of analog input signals in at least one input terminal, the plurality of analog input signals having a total signal strength greater than the threshold value, switching the repeating apparatus to a temporary active state, and outputting an output signal from all of the output terminals; and
receiving, during an active state of the repeating apparatus, a plurality of analog input signals in at least one input terminal and outputting an output signal from all of the output terminals.

5. The association unit in accordance with claim 1, wherein, the activation processor maintains the association unit activated for a predetermined period of time.

6. The association unit in accordance with claim 2, wherein, the activation processor maintains the association unit activated for a predetermined period of time.

7. An association unit comprising:
a plurality of signal input terminals for receiving a plurality of input signals;
a plurality of signal output terminals for outputting a plurality of output signals;
an association unit which associates a first plurality of input signals received within an association time with a substantially identical second plurality of output signals;
an association memory which retains the second plurality of output signals;
an activation processor which outputs an activation signal when a threshold number of input signals are received within the association time; and
a repeat processor which generates a third plurality of output signals substantially identical to the second plurality of output signals retained in the association memory in response to receiving the activation signal and one of the first plurality of input signals associated with the second plurality of output signals retained in the association memory.

8. An association unit comprising:
a plurality of signal input terminals for receiving a plurality of input signals;
a plurality of signal output terminals for outputting a plurality of output signals;
an association unit which associates a first plurality of input signals received within an association time with a substantially identical second plurality of output signals;

an association memory which retains the second plurality of output signals;

an activation processor which outputs an activation signal when an input signal exceeds an analog threshold level; and a repeat processor which generates a third plurality of output signals substantially identical to the second plurality of output signals retained in the association memory in response to receiving the activation signal and one of the first plurality of input signals associated with the second plurality of output signals retained in the association memory.

9. A method comprising:

receiving a plurality of input signals;

associating a first plurality of input signals received within an association time with a substantially identical second plurality of output signals;

retaining the second plurality of output signals;

generating an activation signal when a threshold number of input signals are received within the association time; and outputting a third plurality of output signals substantially identical to the retained second plurality of output signals in response to receiving at least one of the first plurality of input signals associated with the retained second plurality of output signals.

10. A method comprising:

receiving a plurality of input signals;

associating a first plurality of input signals received within an association time with a substantially identical second plurality of output signals;

retaining the second plurality of output signals;

generating an activation signal when an input signal exceeds an analog threshold level; and outputting a third plurality of output signals substantially identical to the retained second plurality of output signals in response to receiving an activation signal and at least one of the first plurality of input signals associated with the retained second plurality of output signals.

11. A system comprising:

a plurality of association units coupled together to form an interconnected network;

each association unit comprising, a plurality of signal input terminals for receiving a plurality of input signals;

a plurality of signal output terminals for outputting a plurality of output signals;

an association unit which associates a first plurality of input signals received within an association time with a substantially identical second plurality of output signals;

an association memory which retains the second plurality of output signals;

an activation processor which outputs an activation signal when a threshold number of input signals are received within the association time; and a repeat processor which generates a third plurality of output signals substantially identical to the second plurality of output signals retained in the association memory in response to receiving the activation signal and one of the first plurality of input signals associated with the second plurality of output signals retained in the association memory.

12. A system comprising:

a plurality of association units coupled together to form an interconnected network;

each association unit comprising, a plurality of signal input terminals for receiving a plurality of input signals;

a plurality of signal output terminals for outputting a plurality of output signals;

an association unit which associates a first plurality of input signals received within an association time with a substantially identical second plurality of output signals;

an association memory which retains the second plurality of output signals;

an activation processor which outputs an activation signal when an input signal exceeds an analog threshold level; and a repeat processor which generates a third plurality of output signals substantially identical to the second plurality of output signals retained in the association memory in response to receiving the activation signal and one of the first plurality of input signals associated with the second plurality of output signals retained in the association memory.

\* \* \* \* \*

UNITED STATES PATENT AND TRADEMARK OFFICE
CERTIFICATE OF CORRECTION

PATENT NO.    : 6,463,424 B1                                              Page 1 of 1
DATED         : October 8, 2002
INVENTOR(S)   : Ogata et al.

It is certified that error appears in the above-identified patent and that said Letters Patent is hereby corrected as shown below:

Title page,
Item [76], insert -- [73] Assignee: Taiko Pharmaceutical Co., Ltd., Osaka (JP) --.
Above Item [57], insert -- [74] *Attorney, Agent, or Firm*—Finnegan, Henderson, Farabow, Garrett & Dunner, L.L.P. --

Column 22,
Line 16, change "terminal the" to -- terminal, the --.

Signed and Sealed this

Twenty-fifth Day of March, 2003

JAMES E. ROGAN
*Director of the United States Patent and Trademark Office*